(12) United States Patent
Takashima

(10) Patent No.: US 11,570,371 B2
(45) Date of Patent: Jan. 31, 2023

(54) IMAGING APPARATUS, IMAGING METHOD, AND PROGRAM

(71) Applicant: Sony Group Corporation, Tokyo (JP)

(72) Inventor: Masatoshi Takashima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 391 days.

(21) Appl. No.: 16/633,667

(22) PCT Filed: Jul. 18, 2018

(86) PCT No.: PCT/JP2018/026825
§ 371 (c)(1),
(2) Date: Jan. 24, 2020

(87) PCT Pub. No.: WO2019/026618
PCT Pub. Date: Feb. 7, 2019

(65) Prior Publication Data
US 2021/0144287 A1 May 13, 2021

(30) Foreign Application Priority Data

Aug. 1, 2017 (JP) .............................. JP2017-148857

(51) Int. Cl.
*H04N 5/235* (2006.01)
*G06T 7/90* (2017.01)
(Continued)

(52) U.S. Cl.
CPC .......... *H04N 5/2353* (2013.01); *G01J 1/4204* (2013.01); *G01J 1/4214* (2013.01);
(Continued)

(58) Field of Classification Search
CPC ............... H04N 5/2353; H04N 5/2351; H04N 5/2352; H04N 5/238; H04N 9/04553;
(Continued)

(56) References Cited

U.S. PATENT DOCUMENTS

| 5,999,650 A | 12/1999 | Ligon |
| 2007/0154203 A1 | 7/2007 | Takahashi |
| 2009/0027518 A1* | 1/2009 | Kita .................. H04N 9/083 348/241 |

(Continued)

FOREIGN PATENT DOCUMENTS

| CN | 101013252 A | 8/2007 |
| CN | 103091296 A | 5/2013 |

(Continued)

OTHER PUBLICATIONS

Extended European Search Report dated May 6, 2020 for corresponding European Application No. 18841298.5.
European Patent Office Communication Pursuant to Article 94(3) dated May 6, 2021 for corresponding European Application No. 18841298.5.

*Primary Examiner* — Timothy J Henn
(74) *Attorney, Agent, or Firm* — Michael Best & Friedrich LLP

(57) ABSTRACT

The present technology relates to an imaging apparatus, an imaging method, and a program that perform appropriate exposure control, to thereby enable a desired object to be appropriately imaged.
The present technology includes: an imaging unit including a plurality of pixels having different spectral characteristics; and an exposure control unit setting information associated with exposure control on the plurality of pixels depending on specification information for specifying a kind of a measurement target. Alternatively, the present technology includes: an imaging unit including a plurality of pixels having different spectral characteristics; and an exposure control unit setting information associated with exposure control on the plurality of pixels on the basis of a predicted output value of each of the plurality of pixels based on a spectral characteristic related to a measurement target. The (Continued)

present technology is applicable to an imaging apparatus which senses vegetation, for example.

20 Claims, 20 Drawing Sheets

(51) Int. Cl.
*G01J 3/28* (2006.01)
*G01J 1/42* (2006.01)
*G03B 7/097* (2021.01)
*H04N 5/238* (2006.01)
*G01N 21/63* (2006.01)
*G01J 3/12* (2006.01)

(52) U.S. Cl.
CPC ............ *G01J 3/2803* (2013.01); *G03B 7/097* (2013.01); *G06T 7/90* (2017.01); *H04N 5/238* (2013.01); *H04N 5/2351* (2013.01); *H04N 5/2352* (2013.01); *G01J 2001/4266* (2013.01); *G01J 2003/1213* (2013.01); *G01J 2003/2806* (2013.01); *G01J 2003/2813* (2013.01); *G01N 2021/635* (2013.01); *G06T 2207/30188* (2013.01)

(58) Field of Classification Search
CPC ...... H04N 9/04559; H04N 5/332; H04N 9/07; G01J 1/4204; G01J 1/4214; G01J 3/2803; G01J 2001/4266; G01J 2003/1213; G01J 2003/2806; G01J 2003/2813; G01J 3/0264; G03B 7/097; G03B 42/00; G06T 7/90; G06T 2207/30188; G01N 2021/635; G01N 21/31; G01N 2021/8466; G01N 2201/0616

See application file for complete search history.

(56) References Cited

U.S. PATENT DOCUMENTS

| | | | |
|---|---|---|---|
| 2010/0007775 A1* | 1/2010 | Wang .................... | H04N 5/361 348/241 |
| 2013/0039580 A1* | 2/2013 | Robles-Kelly ......... | G06V 20/13 382/191 |
| 2014/0055635 A1 | 2/2014 | Seo | |
| 2016/0065859 A1* | 3/2016 | Robles-Kelly ....... | H04N 5/2351 348/229.1 |
| 2018/0136116 A1* | 5/2018 | Takashima ........... | G01N 21/274 |

FOREIGN PATENT DOCUMENTS

| | | | | |
|---|---|---|---|---|
| CN | 105210361 A | 12/2015 | | |
| CN | 105222725 A | 1/2016 | | |
| JP | 2002369059 A | 12/2002 | | |
| JP | 2009118359 A | * 5/2009 | ............ | G02B 5/284 |
| JP | 2010182023 A | * 8/2010 | | |
| JP | 2011114662 A | 6/2011 | | |
| JP | 2011147469 A | * 8/2011 | | |
| JP | 2012-163482 A | 8/2012 | | |
| JP | 2017011459 A | 1/2017 | | |
| KR | 20040085931 A | 10/2004 | | |
| WO | 2014/153603 A1 | 10/2014 | | |
| WO | 2015/086296 A1 | 6/2015 | | |
| WO | WO-2016208415 A | 12/2016 | | |
| WO | WO-2016208415 A1 | * 12/2016 | ............... | A01G 7/00 |
| WO | WO-2017010258 A1 | 1/2017 | | |
| WO | WO-2017010261 A1 | 1/2017 | | |

* cited by examiner

FIG.18

| OBJECT INFORMATION | LIGHT SOURCE PATTERN | | | |
|---|---|---|---|---|
| | 1 | 2 | ... | M |
| 1 | | | | |
| 2 | | | | |
| ⋮ | | | | |
| N | | | | |

231

IMAGING APPARATUS, IMAGING METHOD, AND PROGRAM

TECHNICAL FIELD

The present technology relates to an imaging apparatus, an imaging method, and a program, and to an imaging apparatus, an imaging method, and a program that are suitably used for sensing a predetermined object, for example.

BACKGROUND ART

It has been known that photosynthesis of plants is not affected by light energy but is affected by the number of photons that are particles of light. There has been proposed to measure photon flux density effective in photosynthesis of a plant, to thereby sense the growth of the plant (for example, see PTL 1).

CITATION LIST

Patent Literature

[PTL 1]
Japanese Patent Laid-open No. 2012-163482

SUMMARY

Technical Problems

In sensing a plant, if imaging is not performed with settings suitable for sensing conditions, the plant is not appropriately sensed. For example, appropriate imaging cannot be performed with overexposure, resulting in inappropriate sensing.

Further, for example, in a case where a sensing target is a plant, there is a wavelength of light for sensing suitable for the plant, and the plant cannot be appropriately sensed when being imaged with a wavelength other than the suitable wavelength. Since an appropriate wavelength is different between sensing targets and changes as imaging conditions change, it is desirable that not one wavelength but a plurality of wavelengths be used in imaging.

In a case where a plurality of wavelengths is used in processing, it is desirable that, for example, appropriate settings that prevent overexposure be made on the basis of sensing targets, imaging conditions, wavelengths, or other matters, and control be made on the basis of the settings.

The present technology has been made in view of such a circumstance, and enables to make appropriate settings and perform imaging based on the settings.

Solution to Problems

According to one aspect of the present technology, there is provided a first imaging apparatus including: an imaging unit including a plurality of pixels having different spectral characteristics; and an exposure control unit setting information associated with exposure control on the plurality of pixels depending on specification information for specifying a kind of a measurement target.

According to one aspect of the present technology, there is provided a first imaging method including setting, by an imaging apparatus which performs imaging by an imaging unit including a plurality of pixels having different spectral characteristics, information associated with exposure control on the plurality of pixels depending on specification information for specifying a kind of a measurement target.

According to one aspect of the present technology, there is provided a first program for causing a computer which controls an imaging apparatus including an imaging unit including a plurality of pixels having different spectral characteristics to execute processes including a step of: setting information associated with exposure control on the plurality of pixels depending on specification information for specifying a kind of a measurement target.

According to one aspect of the present technology, there is provided a second imaging apparatus including: an imaging unit including a plurality of pixels having different spectral characteristics; and an exposure control unit configured to set information associated with exposure control on the plurality of pixels on the basis of a predicted output value of each of the plurality of pixels based on a spectral characteristic related to a measurement target.

In the first imaging apparatus, imaging method, and program according to one aspect of the present technology, the imaging unit including the plurality of pixels having the different spectral characteristics performs imaging and sets information associated with exposure control on the plurality of pixels depending on specification information for specifying a kind of a measurement target.

The second imaging apparatus according to one aspect of the present technology includes the imaging unit including the plurality of pixels having the different spectral characteristics, and sets information associated with exposure control on the plurality of pixels on the basis of a predicted output value of each of the plurality of pixels based on a spectral characteristic related to a measurement target.

Note that the imaging apparatus may be an independent apparatus or an internal block included in one apparatus.

Further, the program can be provided by being transmitted through a transmission medium or recorded on a recoding medium.

Advantageous Effect of Invention

According to one aspect of the present technology, it is possible to make appropriate settings and perform imaging based on the settings.

Note that the effects described here are not necessarily limited and may be any effect described in the present disclosure.

BRIEF DESCRIPTION OF DRAWINGS

FIG. 18 is a diagram that is an example of a conversion table.

DESCRIPTION OF EMBODIMENTS

A mode for carrying out the present technology (hereinafter referred to as an "embodiment") will be described below.

<System Including Imaging Apparatus>

Figure 1:
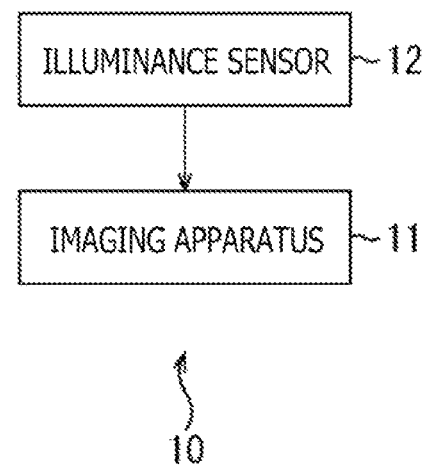
FIG. 1 is a diagram illustrating a configuration of a system of one embodiment that includes an imaging apparatus to which the present technology is applied.

FIG. 1 is a diagram illustrating a configuration of a system of one embodiment that includes an imaging apparatus to which the present technology is applied. An imaging system 10 illustrated in FIG. 1 includes an imaging apparatus 11 and an illuminance sensor 12.

Figure 2:
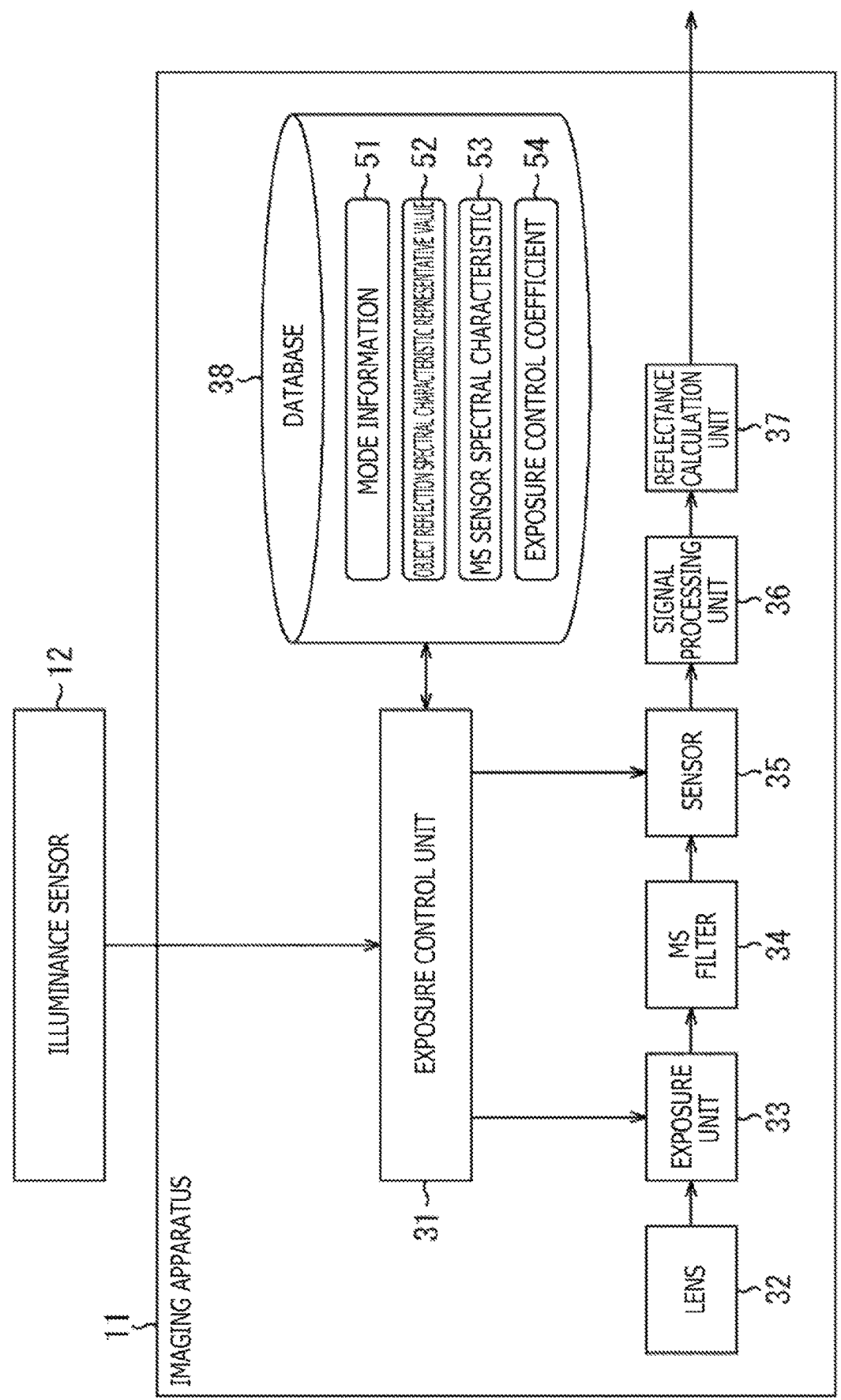
FIG. 2 is a diagram illustrating a configuration of the imaging apparatus.

The imaging apparatus 11 has a configuration as illustrated in FIG. 2 and images an object that is a measurement target. The illuminance sensor 12 is an apparatus measuring an illuminance of sunlight, and supplies measured illuminance information (illuminance value) to the imaging apparatus 11.

The imaging apparatus 11 and the illuminance sensor 12 are configured to transmit and receive data therebetween by wireless or wired communication. For example, the imaging apparatus 11 is mounted on the lower side (ground side) of a remote control or autonomous unmanned aerial vehicle, which is called "drone," for example, and the illuminance sensor 12 is mounted on the upper side (sky side) of the unmanned aerial vehicle. The imaging apparatus 11 sets an exposure value and other matters on the basis of illuminance information obtained by the illuminance sensor 12, to thereby perform imaging as described later.

Note that a description continues on the assumption that the imaging apparatus 11 and the illuminance sensor 12 are separate components, but the imaging apparatus 11 and the illuminance sensor 12 may be provided in the same casing. Further, the imaging apparatus 11 and the illuminance sensor 12 may each be included in the unmanned aerial vehicle.

Further, the description continues with the use of the example using the illuminance sensor 12, but the present technology is also applicable to a system configuration not including the illuminance sensor 12. In a case where the present technology is applied to a system not including the illuminance sensor 12, instead of an illuminance value that is obtained by the illuminance sensor 12, for example, the representative spectral characteristic of sunlight (for example, the spectral characteristic of daylight in fair weather) can be acquired in advance, and the acquired spectral characteristic can be used.

<Configuration of Imaging Apparatus>

FIG. 2 is a diagram illustrating an example of an internal configuration of the imaging apparatus 11 of a first embodiment to which the present technology is applied. The imaging apparatus 11 includes an exposure control unit 31, a lens 32, an exposure unit 33, an MS filter 34, a sensor 35, a signal processing unit 36, a reflectance calculation unit 37, and a database 38.

In the imaging apparatus 11, light from an object such as the measurement target (reflected light) enters the sensor 35 through the lens 32 and the MS filter 34. "MS" of the MS filter 34 means "multispectral." As described later, the imaging apparatus 11 is configured to obtain, from one unit pixel, signals having a plurality of different wavelengths.

The exposure control unit 31 controls the exposure unit 33 and the sensor 35 so that the sensor 35 performs imaging (sensing) under a state where there is no saturation signal charge and all signal charges fall within a dynamic range. Specifically, the exposure control unit 31 controls an opening amount of an iris (stop) or adjusts an exposure time of the sensor 35, for example, to perform exposure control.

The MS filter 34 can be an optical filter suitable for an index of a measurement target and is a filter through which light having each of a plurality of different wavelengths passes. The MS filter 34 causes light entered through the lens 32 to pass therethrough to enter the sensor 35.

The sensor 35 is an image sensor including a sensing element having a sensor surface on which a plurality of pixels is two-dimensionally arrayed in a repetitive pattern. The sensor 35 detects, by the sensing element, light that has passed through the MS filter 34, to output a measurement signal (measurement data) depending on the light intensity of the light to the signal processing unit 36.

Here, in a case where the imaging apparatus 11 is used as an apparatus which senses vegetation, for example, photosynthetic photon flux density (PPFD) is sometimes sensed. Photosynthesis of plants is affected by the number of photons that are particles of light. A PPFD value indicates the number of incident photons per unit area per unit time at a wavelength of from 400 nm to 700 nm that corresponds to the absorption wavelength of chlorophyll.

Figure 3:
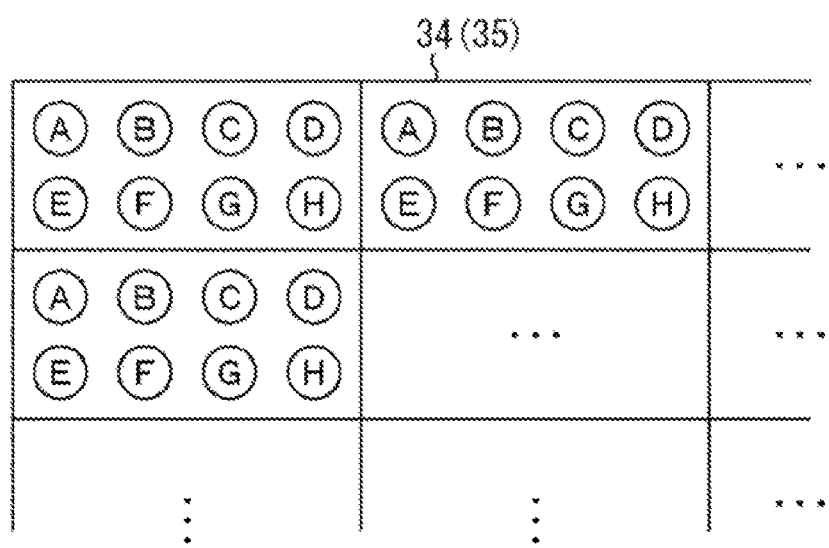
FIG. 3 is a diagram illustrating a configuration of one unit pixel.

In calculation of this PPFD value, an RGB signal is required, and as the MS filter 34, a combination of filters each allowing a wavelength of, for example, R (red), G (green), B (blue), or IR (infrared light) to pass therethrough is used. For example, as illustrated in FIG. 3, one unit pixel includes column×row=2×4=8 pixels, and the pixels respectively receive light beams having wavelengths A to H. The MS filter 34 is a filter allowing each of the light beams having the wavelengths A to H to pass therethrough, and the pixels of the sensor 35 are sensors receiving the transmitted light beams.

In the following, the description continues on the assumption that one unit pixel includes eight pixels, and the pixels are pixels respectively receiving light beams having wavelengths different from each other. Further, in the following, the description continues on the assumption that the simple term "pixel" represents one pixel in one unit pixel, and the term "unit pixel" represents a pixel (group) including eight pixels.

Further, one unit pixel that is a sensor receiving the light beams having the wavelengths A to H can be a sensor receiving light of from 400 nm to 750 nm, for example, and the wavelength A can be 400 nm, the wavelength B can be 450 nm, the wavelength C can be 500 nm, the wavelength D can be 550 nm, the wavelength E can be 600 nm, the wavelength F can be 650 nm, the wavelength G can be 700 nm, and the wavelength H can be 750 nm.

Note that the number of pixels in one unit pixel described here is an example and is not described as limitation. One unit pixel may include, for example, 2×2, that is, four pixels or 4×4, that is, 16 pixels. Further, the wavelength range of light that is received by one unit pixel and the wavelength of light that is received by each pixel are not limited to the examples described above. A wavelength with which a measurement object that is a sensing target can be appropriately sensed can be set. Further, the wavelength is not limited to visible light and may be infrared light or ultraviolet light, for example.

The MS filter 34, allowing light beams having a plurality of wavelengths to pass therethrough in this way, is an optical filter through which a narrow band light in a predetermined narrow wavelength band (narrow band) pass.

A camera using a narrow band component such as a narrow band filter is sometimes referred to as, for example, "multispectral camera," and also in the present technology, a multispectral camera can be used. A multispectral camera is now described.

Figure 4:
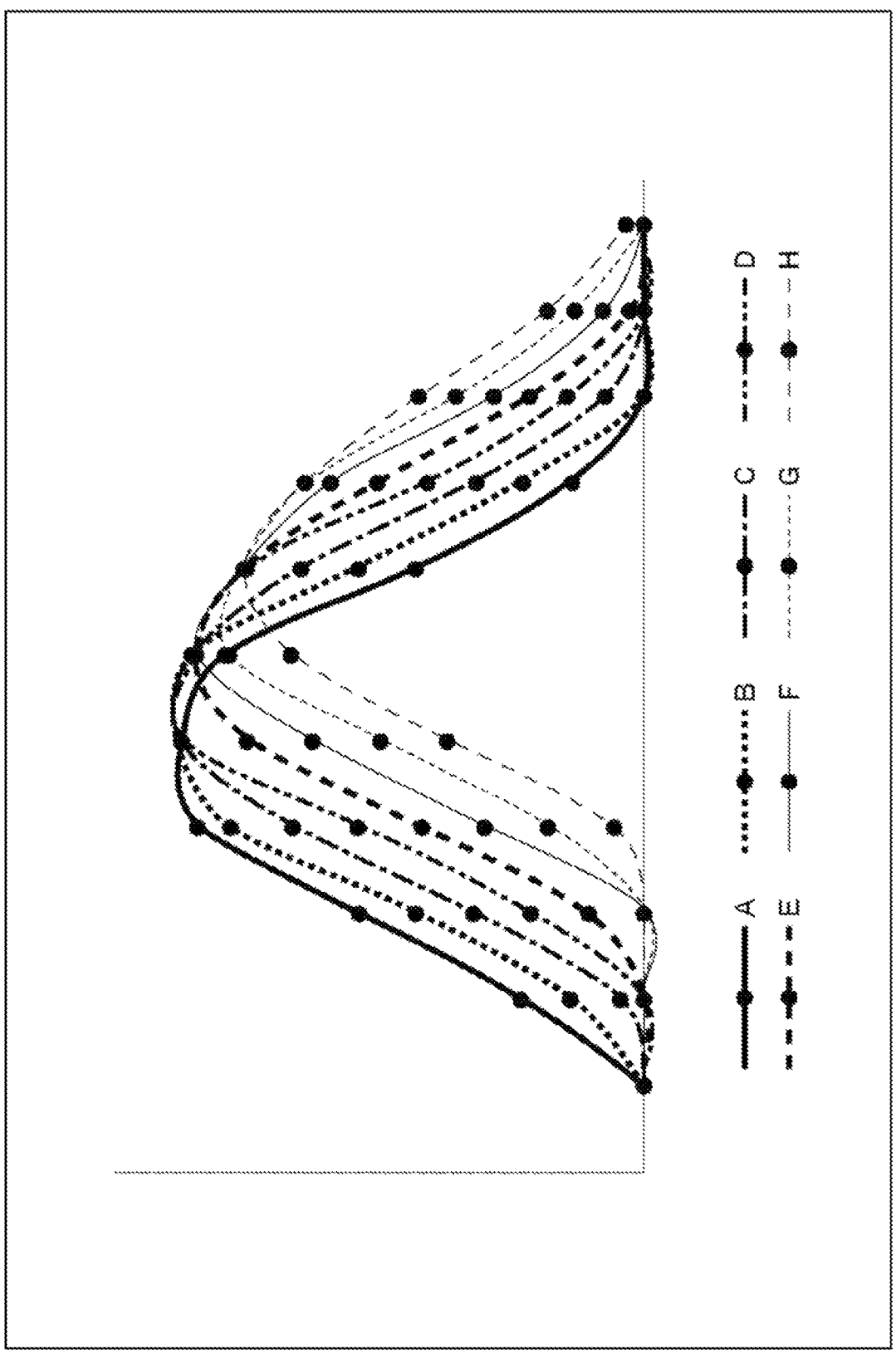
FIG. 4 is a diagram illustrating a characteristic of a filter.

In a case where the wavelengths of light that has passed through the MS filter 34 overlap with each other as illustrated in FIG. 4, an inverse matrix, which is described later, can be solved to extract information regarding a given wavelength of an object.

Figure 5:
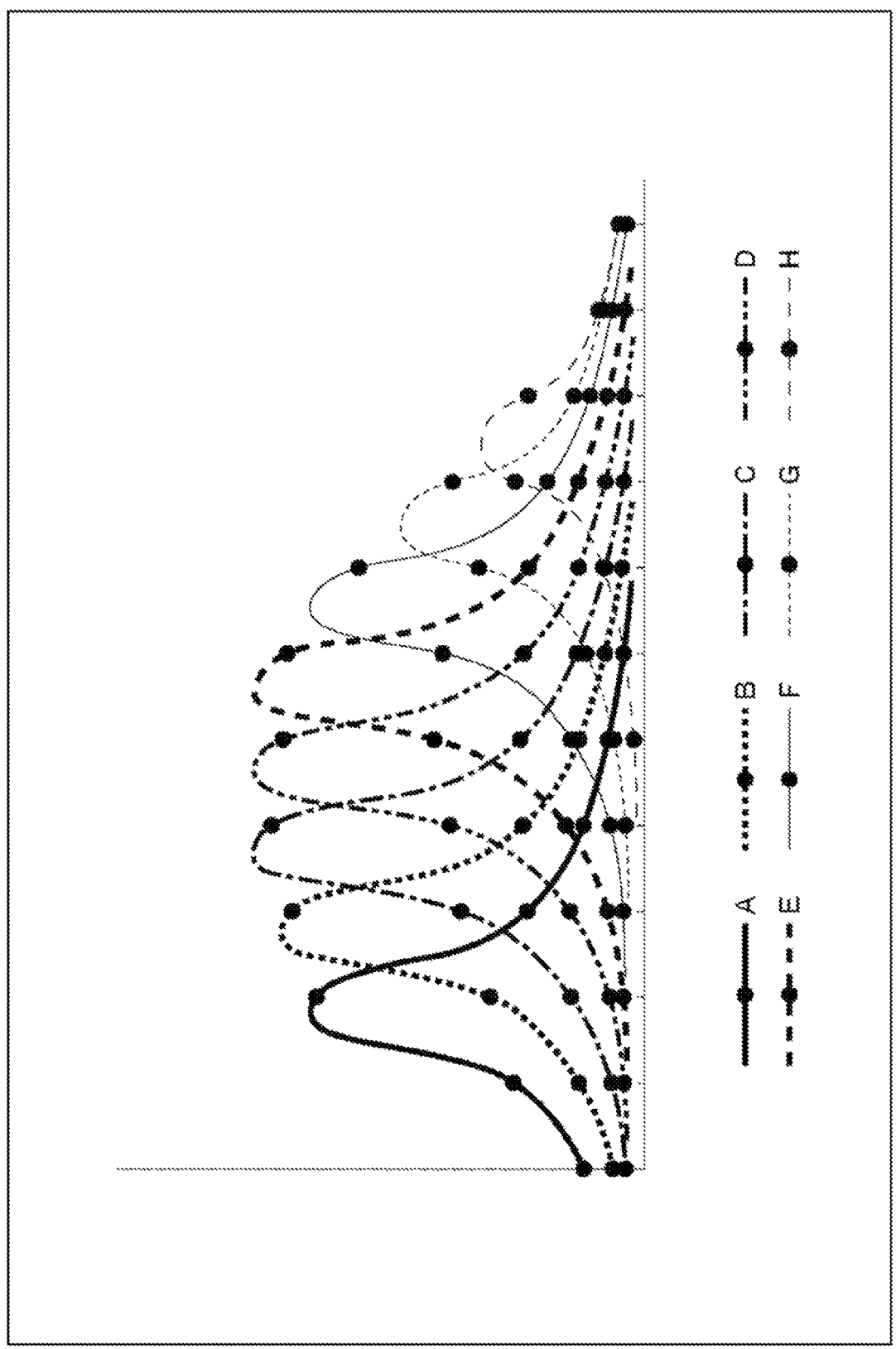
FIG. 5 is a diagram illustrating a characteristic of the filter.

In a case where the wavelengths of light that has passed through the MS filter 34 overlap with each other by a smaller amount as illustrated in FIG. 5, narrow band filters independent of each other can be used. In this case, it is difficult to extract information regarding a given wavelength of an object (it is possible to predict the information from a specific wavelength by interpolation or extrapolation), but sensor output can be predicted without solving an inverse matrix, which is an advantage.

As an optical filter for the case where the wavelengths of light that has passed through the MS filter 34 overlap with each other as illustrated in FIG. 4, a filter which is a kind of a metal thin film filter using a metal thin film such as aluminum and utilizes the principle of surface plasmon resonance can be applied.

As an optical filter for the case where the wavelengths of light that has passed through the MS filter 34 overlap with each other by a smaller amount as illustrated in FIG. 5, a filter which has a sensor surface having a thin film formed thereon and utilizes the principle of Fabry-Perot resonance can be applied.

Further, a multispectral sensor can be formed for each pixel of the sensor 35.

Figure 6:
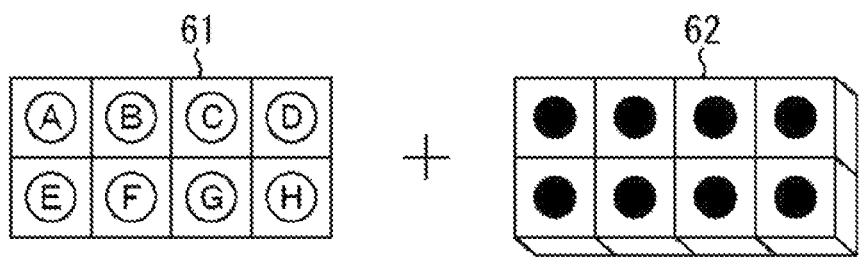
FIG. 6 is a diagram illustrating an example of a configuration of a multi-camera.

Further, as illustrated in FIG. 6, the multispectral camera can include a combination of a multifilter 61 and a multi-camera 62.

The multifilter 61 is a filter through which different light beams pass per pixel group instead of per pixel. For example, regions A to H each have a size corresponding to a group of a×b pixels, and the corresponding regions of the multi-camera 62 have the same sizes as the corresponding regions A to H (the groups of a×b pixels are arranged).

Figure 7:
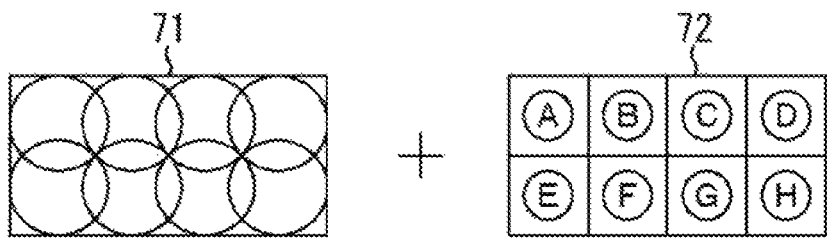
FIG. 7 is a diagram illustrating an example of a configuration of the multi-camera.

In addition, as illustrated in FIG. 7, the multispectral camera can include a combination of a multi-lens array 71 (corresponding to the lens 32 in FIG. 2) and a multifilter 72.

In the multi-lens array 71, convex lenses are two-dimensionally arranged. A light flux that has entered the multi-lens array 71 forms two-dimensional light source images on the multifilter 72 (forms a light source image for each lens of the multi-lens array 171).

The multifilter 72 is a filter divided into a plurality of regions like the multifilter 61 in the FIG. 6, and in this case, is a filter divided into regions each corresponding to one lens of the multi-lens array 71. Alternatively, the multifilter 72 is a filter through which light of a predetermined wavelength passes for each pixel like the MS filter 34 in FIG. 3.

In the case of the multi-camera illustrated in FIG. 6 or FIG. 7, the multifilter 61 (72) can have a characteristic that is the filter characteristic as illustrated in FIG. 4 or the filter characteristic as illustrated in FIG. 5. In addition, the multifilter 61 (72) may be a super narrow band multifilter having a characteristic as illustrated in FIG. 8.

Figure 8:
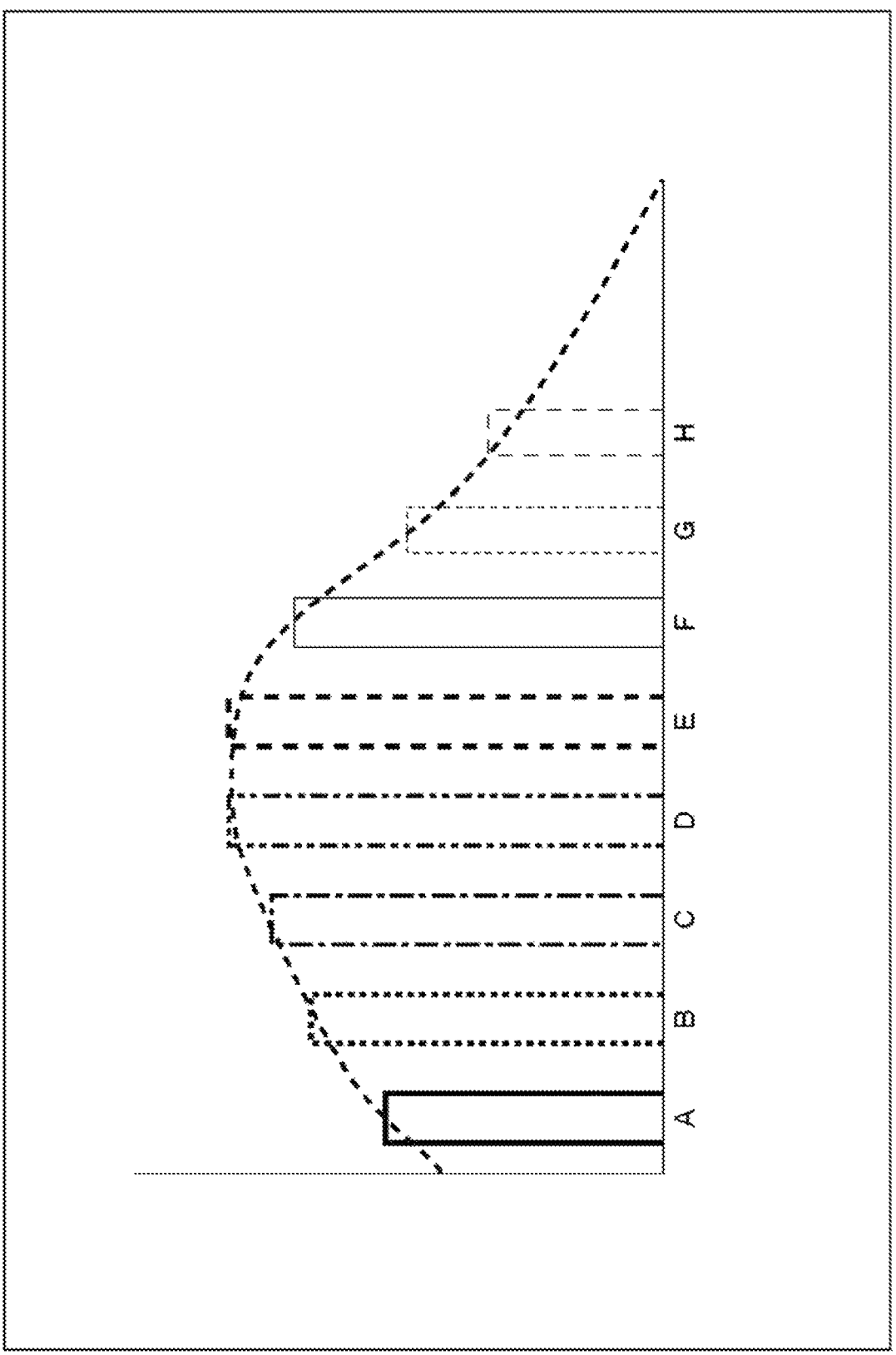
FIG. 8 is a diagram illustrating the characteristic of a filter.

A filter having the characteristic as illustrated in FIG. 8 is called, for example, "dichroic filter," and can include a multilayer including dielectrics having different refractive indices.

The present technology can be applied to (used in) any of these multi-cameras. Here, a case using a filter having the characteristic as illustrated in FIG. 4 is given as an example. The description continues by taking a case using a multi-camera including the MS filter 34 and the sensor 35, as illustrated in FIG. 3, as an example.

Returning back to the description on the configuration of the imaging apparatus 11 illustrated in FIG. 2, the signal processing unit 36 performs, on data that is to be output from the sensor 35, predetermined signal processing such as data sorting processing, and outputs the resultant to the reflectance calculation unit 37. The reflectance calculation unit 37 uses the processed signal to calculate reflectance with respect to reflected light from an imaged object.

The exposure control unit 31 uses data held in the database 38 to control the exposure unit 33 and the sensor 35. In the database 38, mode information 51, an object reflection spectral characteristic representative value 52, an MS sensor spectral characteristic 53, and an exposure control coefficient 54 are stored. These pieces of information are stored in the database 38 in association with each other.

The mode information 51 is information for specifying an object that is an imaging target (object information or specification information). For example, in a case where the object (sensing target) is specified as a plant, a vegetation mode is set. In a case where the object is specified as a structure, a structure mode is set. In a case where the object is specified as food, a food mode is set. For example, the vegetation mode is a mode for sensing vegetation and is a mode suitable for sensing vegetation.

The mode suitable for sensing vegetation is a mode that may fail to optimally image an object other than vegetation, for example, a structure, which is not vegetation, due to overexposure or other factors, and is a mode that images vegetation with an optimum exposure amount.

In the database 38, modes that may possibly be set (objects that may be sensing targets) are stored in advance as the mode information 51.

Further, a mode is set by a user, and another information associated with the mode information 51 corresponding to the set mode, for example, the object reflection spectral characteristic representative value 52 is read out.

Alternatively, a mode may be set by the imaging apparatus 11 so as not to bother the user. For example, the imaging apparatus 11 may pick up an image as a sample and analyze the image, to thereby set a mode. For example, the structure mode is set in a case where it is determined by image analysis that a structure occupies a large part of an image. A mode depending on an object can also be set.

The object reflection spectral characteristic representative value 52 is a representative value depending on a mode, and is a representative value related to reflected light from an object that is a measurement target. For example, when the vegetation mode is set, the object reflection spectral characteristic representative value 52 is a representative value related to vegetation, and is a representative value related to a component of light reflected from a plant to which sunlight is applied (spectral characteristic).

In addition, for example, when the vegetation mode is set, since reflectance is different (characteristics are different) between good vegetation and poor vegetation (well grown plants and poor grown plants), even when reflectance of the same plant that is a measurement target is measured, values to be obtained vary.

The object reflection spectral characteristic representative value 52 is a value taking this variation into account. For example, the object reflection spectral characteristic representative value 52 can be the intermediate value between the upper limit value and lower limit value of reflectance that may be obtained through measurement of a predetermined plant in the vegetation mode.

Note that, in the example described here, the intermediate value is the object reflection spectral characteristic representative value 52, but the object reflection spectral characteristic representative value 52 may be a value other than the intermediate value, for example, a value near the upper limit value or a value near the lower limit value.

Figure 9:
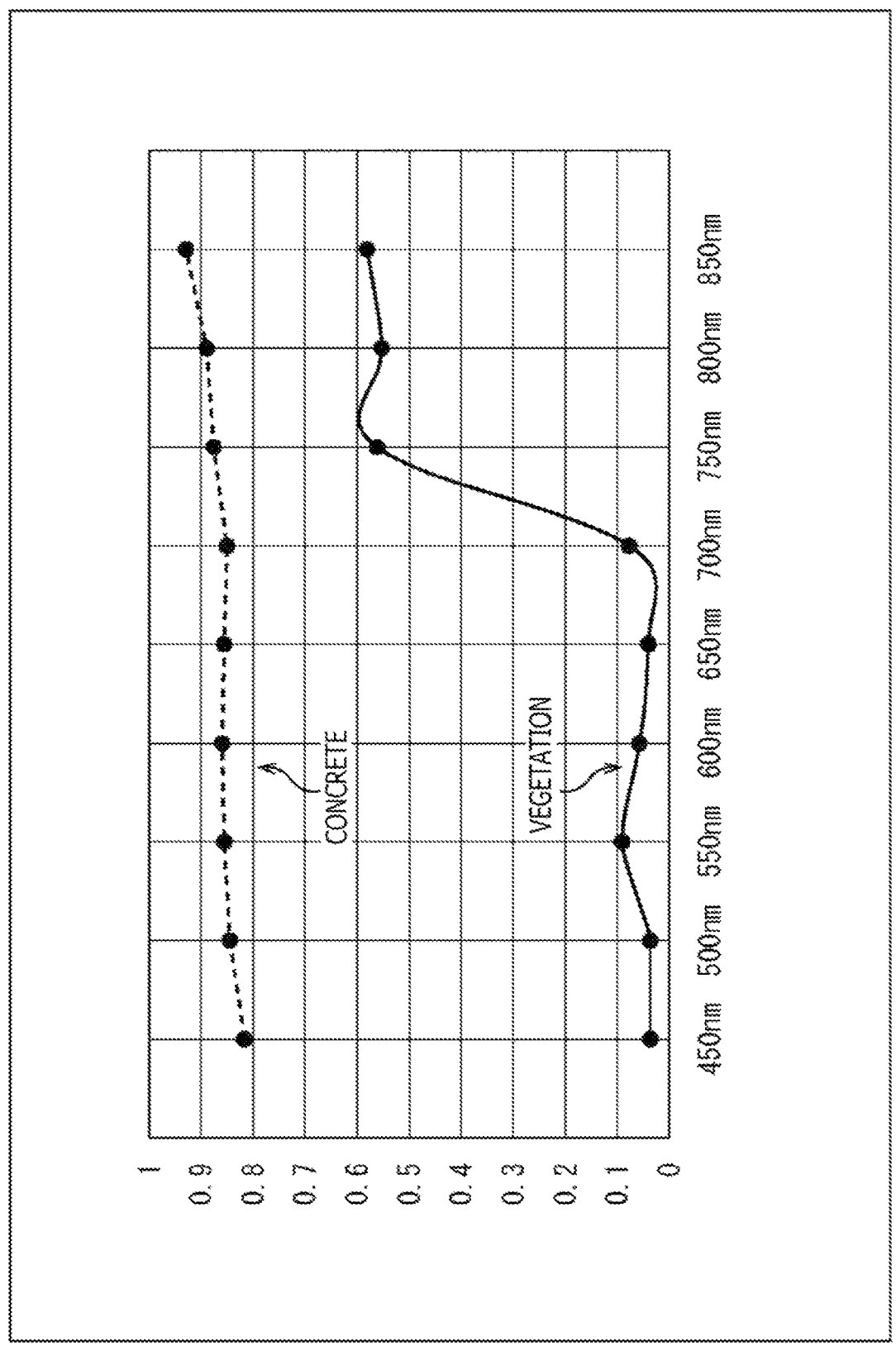
FIG. 9 is a diagram illustrating a reflectance of each of objects.

FIG. 9 is a graph illustrating a relationship between a wavelength and reflectance when the measurement target is vegetation or concrete. In FIG. 9, the horizontal axis represents a wavelength and the vertical axis represents reflectance. Further, in FIG. 9, a graph represented by the solid line indicates results obtained when the measurement target is vegetation (in the vegetation mode), and a graph represented by the dotted line indicates results obtained when the measurement target is concrete (in the structure mode).

For example, when the vegetation mode is set (mode information 51=vegetation mode), the value of the graph represented by the solid line in FIG. 9 is read out from the database 38 as the object reflection spectral characteristic representative value 52 to be supplied to the exposure control unit 31.

Further, for example, when the structure mode is set (mode information 51=structure mode), the value of the graph represented by the dotted line in FIG. 9 is read out from the database 38 as the object reflection spectral characteristic representative value 52 to be supplied to the exposure control unit 31.

The MS sensor spectral characteristic 53 is information representing the spectral characteristic of an MS sensor. The MS sensor is a sensor that is a combination of the MS filter 34 and the sensor 35, and is a sensor configured to receive signals having eight kinds of wavelengths by one unit pixel, for example, as described above. Thus, the MS sensor spectral characteristic 53 is a characteristic affected by the transmittance of the MS filter 34 and the sensitivity of the sensor 35.

Figure 10:
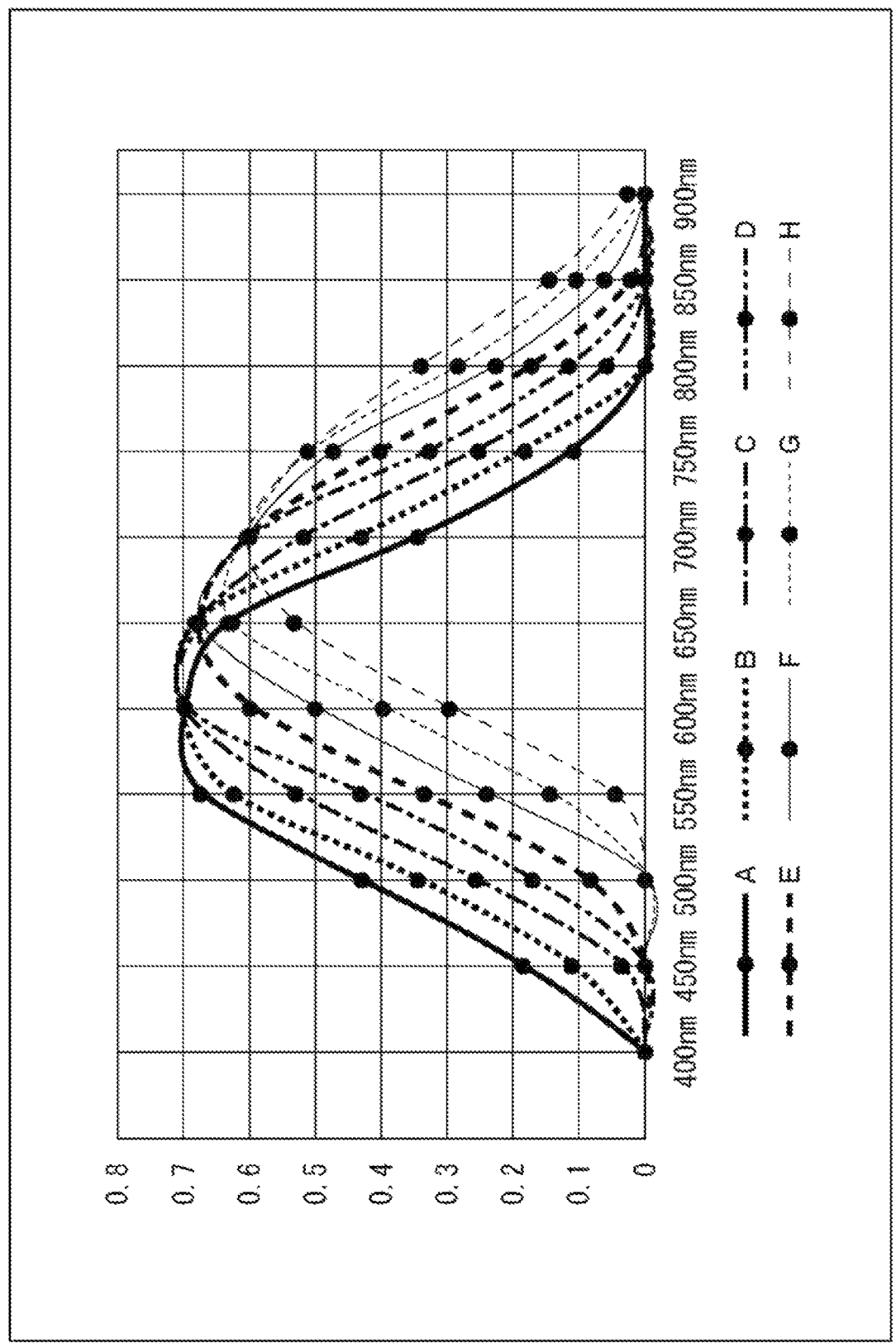
FIG. 10 is a diagram illustrating a spectral characteristic of a sensor.

The MS sensor spectral characteristic 53 is a characteristic as illustrated in FIG. 10, for example. FIG. 10 illustrates the spectral characteristic of each wavelength of the wavelengths A to H. In FIG. 10, the horizontal axis represents a wavelength and the vertical axis represents transmittance. The value of transmittance is a value obtained by multiplying the transmittance of the MS filter 34 and the sensitivity of the sensor 35 together. Further, the sensitivity of the sensor 35 is sensitivity with respect to sensitivity set as a reference, and is normalized sensitivity.

Since spectral characteristics do not depend on a mode, data of a spectral characteristic corresponding to the MS sensor is stored in the database 38, and irrespective of a mode to be set, the same data is read out from the database 38 to be supplied to the exposure control unit 31.

The exposure control coefficient 54 is a coefficient that is set for each mode, and is a coefficient for setting an exposure value that prevents overexposure in imaging an object that is a measurement target.

The exposure control unit 31 uses an illuminance value that is supplied from the illuminance sensor 12 and information that is supplied from the database 38 to set an optimum exposure value that prevents overexposure in imagining an object that is a measurement target, and controls the stop of the exposure unit 33 and the shutter speed of the sensor 35 on the basis of the set exposure value.

Note that the exposure value is a combination of control values that the exposure control unit 31 uses to control the exposure unit 33 and the sensor 35, to thereby achieve imaging with an appropriate exposure amount. Specifically, the exposure value is a combination of a control value for controlling the stop of the exposure unit 33, a control value for controlling the shutter speed of the sensor 35, and a control value for controlling the gain (sensitivity) of the sensor 35.

The appropriate exposure amount is an exposure amount that prevents overexposure. The exposure amount is set through adjustment of the sensitivity, the stop, and the shutter speed. The sensitivity is the gain of the sensor 35. The stop is the opening amount of the stop of the lens 32. The shutter speed is the exposure time of the sensor 35.

The exposure control unit 31 controls the stop of the exposure unit 33 and the shutter speed and gain of the sensor 35 on the basis of the exposure value.

<Operation of Imaging Apparatus>

Figure 11:
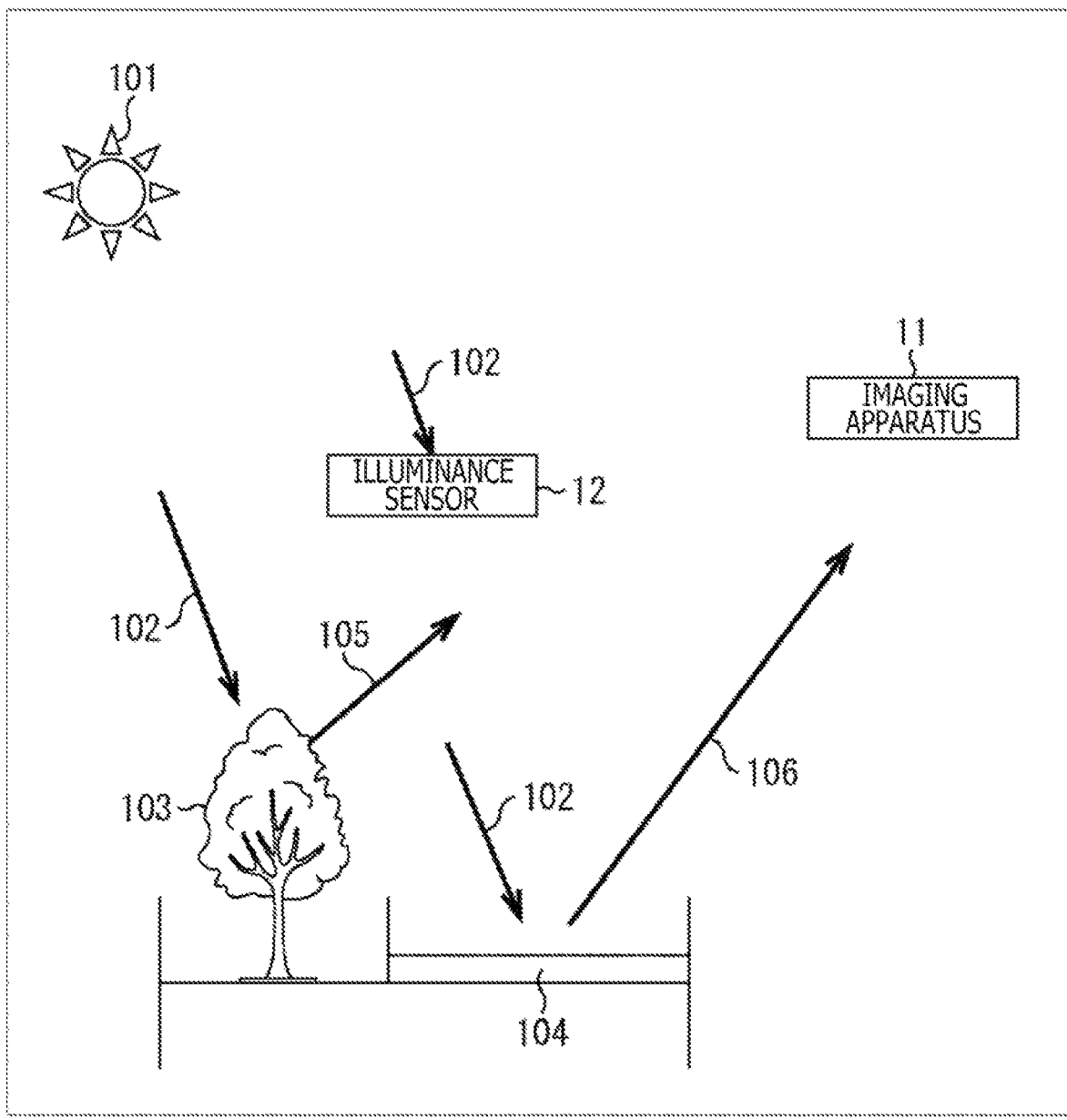
FIG. 11 is a diagram illustrating operation of the imaging apparatus.

With reference to FIG. 11, an outline of operation of the imaging apparatus 11 is described.

Sunlight 102 from a sun 101 applies to the illuminance sensor 12 as well as a plant 103 and a road 104. The illuminance sensor 12 measures the illuminance of the sunlight 102 which is applied.

The sunlight 102 applied to the plant 103 is partly reflected by the plant 103, and reflected light 105 thereof is received by the imaging apparatus 11. Further, the sunlight 102 applied to the road 104 is partly reflected by the road 104, and reflected light 106 thereof is received by the imaging apparatus 11.

FIG. 9 is referred to again now. As illustrated in FIG. 9, the reflectance values of the plant 103 and the road 104 (concrete) when light having the same wavelength is applied thereto are different from each other. For example, in FIG. 9, concrete reflectance represented by the dotted line is higher than vegetation reflectance represented by the solid line.

Further, in FIG. 9, the concrete reflectance represented by the dotted line is reflectance that is substantially constant irrespective of light wavelengths, but the vegetation reflectance represented by the solid line sharply changes at a specific light wavelength. From FIG. 9, in a case where a plant is the measurement target, the reflectance is high when light has a wavelength of 700 nm or higher.

In this way, since the reflected light 105 from the plant 103 and the reflected light 106 from the road 104, which are obtained through application of the same sunlight 102, are different from each other, kinds of objects can be distinguished through comparison of measurement results of reflectance.

In a case where the measurement target is the plant 103 (vegetation), the imaging apparatus 11 sets the vegetation mode to set an exposure value suitable for imaging the plant 103. Further, in a case where the measurement target is the road 104 (concrete), the imaging apparatus 11 sets the structure mode to set an exposure value suitable for imaging the road 104. Here, the suitable exposure value is an exposure value that prevents overexposure in imaging an object that is a measurement target as described above.

Figure 12:
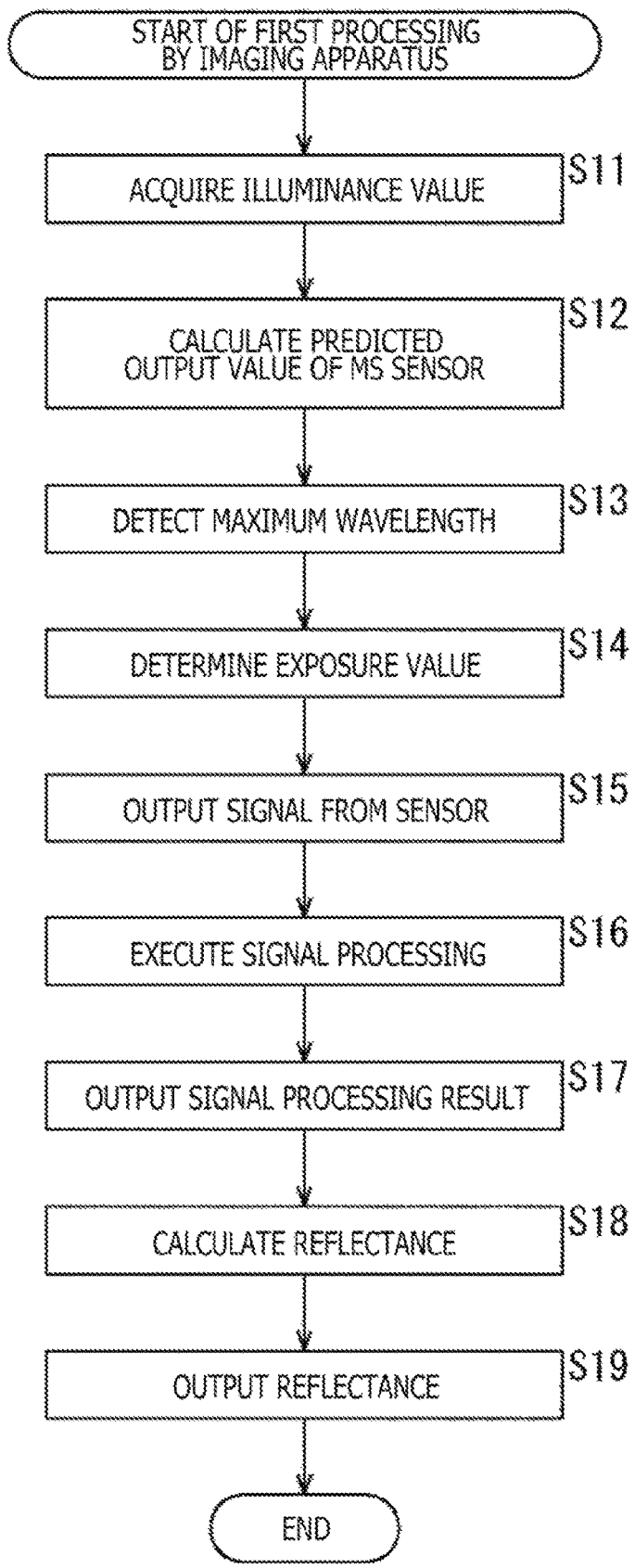
FIG. 12 is a flow chart illustrating the operation of the imaging apparatus.

With reference to the flow chart of FIG. 12, the operation of the imaging apparatus 11, in other words, operation up to setting the exposure value is described.

Figure 13:
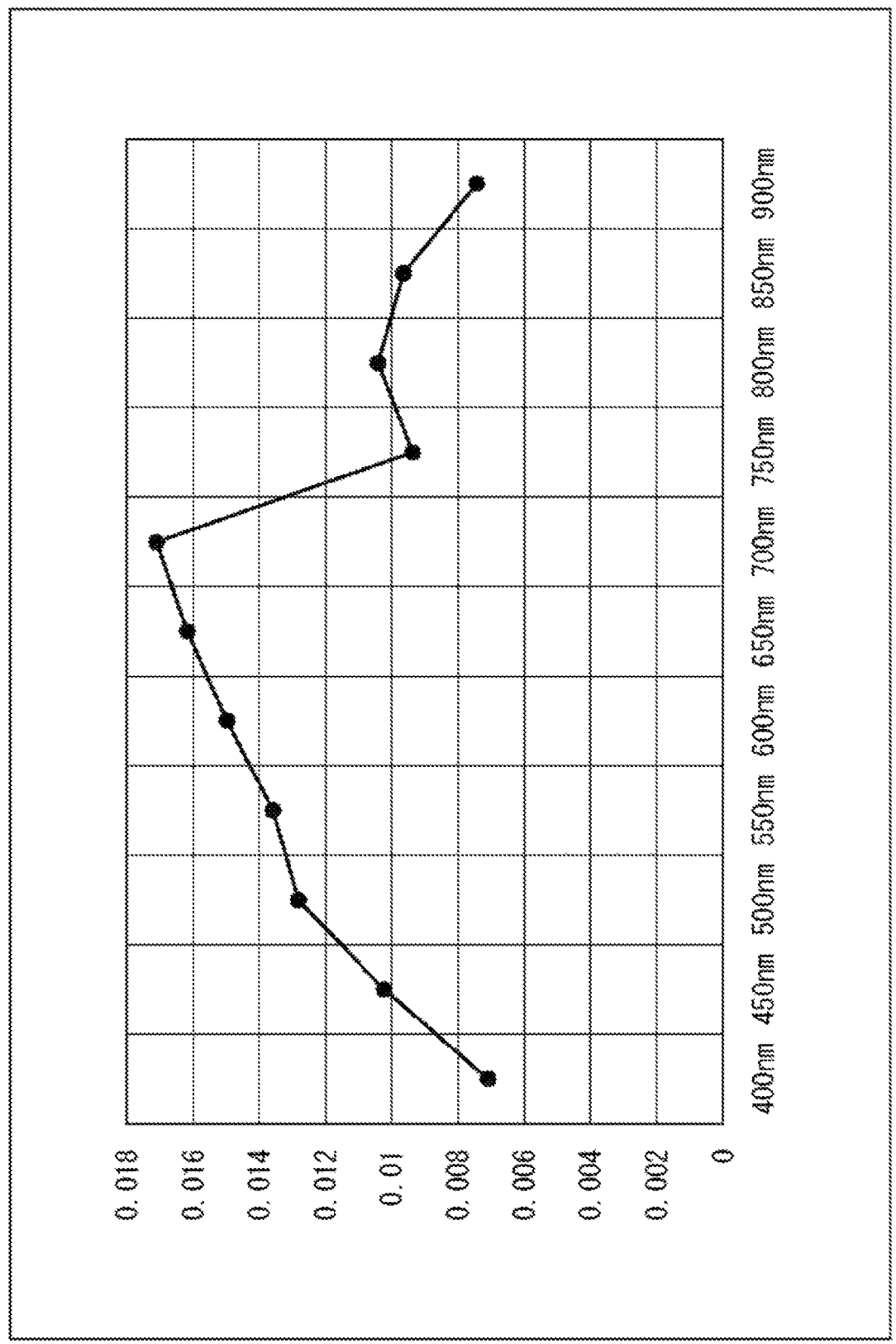
FIG. 13 is a diagram illustrating a spectrum of a light source.

In Step S11, the imaging apparatus 11 acquires an illuminance value from the illuminance sensor 12. For example, the imaging apparatus 11 acquires the spectral characteristic of the sunlight 102 as illustrated in FIG. 13. The graph of FIG. 13 indicates the spectral characteristic of the sunlight 102 and has the horizontal axis representing a light wavelength and the vertical axis representing light intensity.

The illuminance sensor 12 and the imaging apparatus 11 are configured to transmit and receive the spectral characteristic of the sunlight 102 (illuminance value) therebetween wirelessly, for example, and the illuminance value acquired by the illuminance sensor 12 in Step S11 is supplied to the imaging apparatus 11. Note that, in a system not including the illuminance sensor 12, a representative example of the spectral characteristic of the sunlight 102 as illustrated in FIG. 13 may be held such that the held spectral characteristic may be used.

In Step S12, a predicted output value of the MS sensor is calculated. The exposure control unit 31 of the imaging apparatus 11 acquires the illuminance value from the illuminance sensor 12 and the object reflection spectral characteristic representative value 52 and the MS sensor spectral characteristic 53 from the database 38.

In a case where a set mode is, for example, the vegetation mode, the object reflection spectral characteristic representative value 52 of vegetation, for example, the graph represented by the solid line in FIG. 9 is supplied from the database 38 to the exposure control unit 31. Further, for example, in a case where the structure mode is set, the object reflection spectral characteristic representative value 52 of a structure (concrete), for example, the graph represented by the dotted line in FIG. 9 is supplied to the exposure control unit 31.

Further, data that is read out from the database 38 as the MS sensor spectral characteristic 53 to be supplied to the exposure control unit 31 is the data as illustrated in FIG. 10.

The exposure control unit 31 uses these pieces of data to calculate a predicted output value of the MS sensor, in other words, a predicted value that is obtained by predicting the value to be output from the sensor 35 (FIG. 2). This calculation is based on Expression (1) below.

[Math. 1]

$$\text{SensorOut}(\text{filter}:M) = \Sigma_1^N \{\text{Light}(\text{band}:N) \times \text{Reflectance}(\text{band}:N) \times \text{MSFilter}(\text{band}:N)\} \times W(\text{bandwidth}) \times (\text{control-value product}) \times (\text{predetermined coefficient}) \quad (1)$$

In Expression (1), "N" represents the number of filters, and, for example, N=8 in a case where the sensor selectively receiving light beams having eight wavelengths, as illustrated in FIG. 3, is used. Further, in Expression (1), "Light (bands 1 to N)" is the spectral characteristic of a light source, and in this case, is an illuminance value to be supplied from the illuminance sensor 12.

Further, in Expression (1), "Reflectance (bands 1 to N)" is the reflectance of an object, and in this case, is the object reflection spectral characteristic representative value 52 to be read out from the database 38. Further, in Expression (1), "MS filter (bands 1 to N)" is the spectral characteristic of a filter of each pixel of a multispectral sensor, and in this case, is the MS sensor spectral characteristic 53 to be read out from the database 38.

Further, in Expression (1), "(control-value product)" is the product of values obtained by normalizing each of a control value for controlling the stop of the exposure unit 33, a control value for controlling the exposure time of the sensor 35, and a control value for controlling the gain (sensitivity) of the sensor 35. Further, in Expression (1), "(predetermined coefficient)" is a coefficient related to photoelectric conversion by the sensor 35.

In Expression (1), these values are multiplied together for each band and the resultant is integrated with a bandwidth (w) to obtain the sum ($\Sigma$(bands 1 to N)), and this sum is calculated as a predicted value of the value to be output from the pixel (sensor 35).

The predicted value is calculated with a control-value product being, for example, a value set in advance depending on an illuminance value to be obtained from the illuminance sensor 12.

Figure 14:
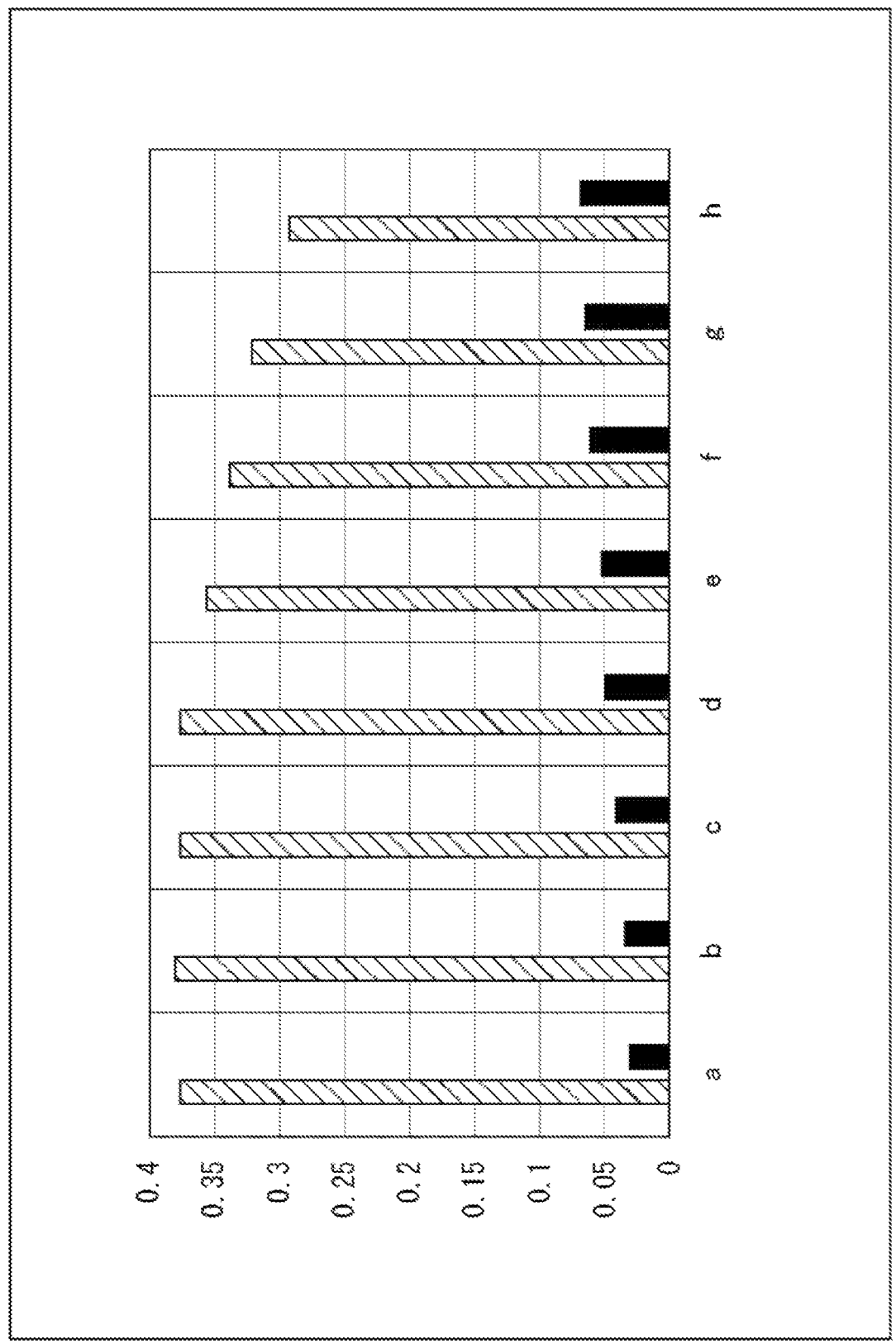
FIG. 14 is a diagram illustrating predicted values.

Examples of results of such calculation are illustrated in FIG. 14. FIG. 14 illustrates predicted values in the case of vegetation and predicted values in the case of concrete. In FIG. 14, for the sake of description, vegetation and concrete are illustrated in the same figure, but as predicted values that are calculated in Step S12 (FIG. 12), only predicted values corresponding to a mode that is set at that time are calculated. Specifically, when the vegetation mode is set, predicted values related to vegetation are calculated, and when the structure mode is set, predicted values related to a structure are calculated.

In the graph of FIG. 14, a graph represented by the bold lines indicates predicted values when the vegetation mode is set, and a graph represented by the hatched lines indicates predicted values when the structure mode is set. Further, in the graph of FIG. 14, the vertical axis represents a predicted value, and the horizontal axis represents a wavelength (wavelength band) that is classified into eight wavelength bands a to h.

With reference to FIG. 14, it is clear that different predicted values are calculated between the wavelengths. It is also clear that different predicted values are calculated between a structure (concrete) and vegetation.

In the example illustrated in the graph of FIG. 14, the predicted value is calculated for each of the eight wavelength bands. The eight wavelength bands (eight predicted values) are applied to a case where the MS sensor in which one unit pixel includes eight pixels receiving respective light beams having eight wavelengths, as illustrated in FIG. 3, is used, and a predicted value is calculated for each of the light beams having the eight wavelengths that the respective pixels receive.

For example, the predicted value of the wavelength band a is a predicted value of a wavelength band including the wavelength A (FIG. 3), and the predicted value of the wavelength band b is a predicted value of a wavelength band including the wavelength B (FIG. 3). Further, the predicted value of the wavelength band c is a predicted value of a wavelength band including the wavelength C (FIG. 3), and the predicted value of the wavelength band d is a predicted value of a wavelength band including the wavelength D (FIG. 3).

Further, the predicted value of the wavelength band e is a predicted value of a wavelength band including the wavelength E (FIG. 3), and the predicted value of the wavelength band f is a predicted value of a wavelength band including the wavelength F (FIG. 3). The predicted value of the wavelength band g is a predicted value of a wavelength band including the wavelength G (FIG. 3), and the predicted value of the wavelength band h is a predicted value of a wavelength band including the wavelength H (FIG. 3).

Here, the description continues on the assumption that such a relationship is satisfied. In this way, in the case where one unit pixel has eight spectral characteristics (MS sensor spectral characteristics), eight predicted values are calculated.

Referring back to the flow chart of FIG. 12, when the predicted output value of the MS sensor is calculated in Step S12, the processing proceeds to Step S13. In Step S13, the maximum wavelength is detected. The maximum wavelength is a wavelength (wavelength band) with which a predicted output value has the maximum value.

For example, in a case where the predicted values as illustrated in FIG. 14 are calculated and the structure mode (concrete) is set, the predicted value of the wavelength band b is detected as the maximum value, and a pixel B in the wavelength band b is specified as a spectral characteristic pixel that may possibly take the maximum value.

Further, for example, in a case where the predicted values as illustrated in FIG. 14 are calculated and the vegetation mode is set, the predicted value of the wavelength band h is detected as the maximum value, and a pixel H in the wavelength band h is specified as a spectral characteristic pixel that may possibly take the maximum value.

In Step S14, an exposure value is determined. The exposure value is a combination of a control value for controlling the stop of the exposure unit 33, a control value for controlling the shutter speed of the sensor 35, and a control value for controlling the gain (sensitivity) of the sensor 35 as described above.

When a spectral characteristic pixel in a wavelength band that provides the maximum predicted output value is detected, an exposure value that prevents overexposure of the spectral characteristic pixel is set, and exposure control is performed with the set exposure value, overexposure do not occur in spectral characteristic pixels in other wavelength bands.

For example, as in the example described above, when the vegetation mode is set, the predicted output value corresponding to the wavelength band h is detected as the maximum value, and the pixel H corresponding to the wavelength band h is specified as the spectral characteristic pixel that may possibly take the maximum value. At this time, an exposure value that prevents overexposure of the pixel H is set, and exposure control is performed with the exposure value, so that overexposure does not occur. Exposure control is similarly performed with the set exposure value on pixels other than the pixel H (in this case, the pixels A to G) that may possibly take predicted output values lower than the predicted output value of the pixel H, so that overexposure does not occur.

In this way, a spectral characteristic pixel in a wavelength band that provides the maximum predicted output value is detected, and the predicted output value is calculated with the use of the object reflection spectral characteristic representative value 52 as described above. For example, when the vegetation mode is set, a predicted output value is calculated with the use of the representative value of the reflectance (object reflection spectral characteristic representative value 52) of a plant, but since the representative value is used, the calculated predicted output value may possibly have an error.

In other words, the reflectance of a plant that is measured is reflectance that varies in a certain range, and a predicted output value is calculated with the use of a representative value being the median in the range, for example, with the result that the predicted output value may possibly have an error.

The exposure control coefficient 54 is a coefficient for absorbing a prediction error of a predicted output value (in this case, the predicted output value with the maximum wavelength set in Step S13).

Setting an exposure value that prevents overexposure is further described. An output value from the sensor 35 (FIG. 2) can be determined by the following expression, for example.

Output value=(spectral characteristic of light source)×(spectral characteristic of object)× (spectral characteristic of sensor)×(control-value product)×(predetermined coefficient)

The spectral characteristic of a light source is, for example, the characteristic as illustrated in FIG. 13 and is the spectral characteristic of light, for example, sunlight which is applied to an object. The spectral characteristic of an object is the reflectance of an object. The spectral characteristic of an object is, for example, the characteristic as illustrated in FIG. 9 and is the characteristic of reflectance that is different between objects.

The spectral characteristic of a sensor is, for example, the characteristic of the MS sensor including the MS filter 34 and the sensor 35 as illustrated in FIG. 10, and is a characteristic obtained by multiplying the transmittance of the MS filter 34 and the sensitivity of the sensor together.

The control-value product is the product of normalized control values of a control value combination (exposure value) set by the exposure control unit 31, and is a value for enabling exposure control for achieving a predetermined exposure amount. The control values are the opening amount of the stop of the exposure unit 33 (stop value), the gain (corresponding to sensitivity) of the sensor 35, and the exposure time (shutter speed) of the sensor 35.

The predetermined coefficient is a coefficient related to photoelectric conversion by the sensor 35.

The control-value product is set such that an output value that is determined by this expression does not exceed a predetermined threshold that causes overexposure. Since the control-value product is the product of normalized control values and the exposure value is a combination of control values, when a control-value product is set, a combination of control values that achieves the control-value product, that is, an exposure value can be set.

When the predicted output value of the MS sensor is calculated in Step S12, in the above description, the predicted output value is calculated by (spectral characteristic of light source)×(spectral characteristic of object)×(spectral characteristic of sensor)×(control-value product)×(predetermined coefficient). The predicted output value in Step S12 is a value obtained by calculating a control-value product and a predetermined coefficient with the use of a value set in advance depending on an illuminance value, for example. Further, the wavelength that provides the maximum predicted output value is detected in Step S13 as described above.

It is conceivable that, when a spectral characteristic pixel having a wavelength that provides the maximum predicted output value does not cause overexposure, other pixels do not cause overexposure either. Thus, the exposure value is set such that the maximum predicted output value is equal to or smaller than a value which does not cause overexposure.

A control-value product (an exposure value derived from a control-value product) with which a relation "predetermined threshold>(spectral characteristic of light source)×(spectral characteristic of object)×(spectral characteristic of sensor)×(control-value product)×(predetermined coefficient)" is satisfied is set. In the above expression, the predetermined threshold is set in advance as a value with which the maximum predicted output value does not cause overexposure, for example.

The control-value product is set to a value depending on an illuminance value that is obtained from the illuminance sensor 12. The control-value product is the product of normalized values of control values for controlling the stop and the shutter speed, and a product that is a combination of control values depending on an illuminance value that is obtained from the illuminance sensor 12 (control-value product) may be set in advance.

For example, with the stop, i.e., the iris being open, the shutter speed being fixed, and the gain (sensitivity) being adjusted to 1×, 2×, or 3×, for example, a control-value product (a combination of control values that achieves the control-value product (exposure value)) that achieves a desired exposure amount may be set.

Further, for example, with the iris being open, the gain being fixed (for example, 2×), and the shutter speed being adjusted, a control-value product (a combination of control values) that achieves a desired exposure amount may be set.

As described above, to achieve the maximum predicted output value being equal to or smaller than a value that prevents overexposure, as the control-value product, a value obtained by multiplying a control-value product set depending on an illuminance value obtained from the illuminance sensor 12 by a safety coefficient (exposure control coefficient 54) is used.

Specifically, the exposure control coefficient 54 is multiplied to the right side of the above expression.

Predetermined threshold>(spectral characteristic of light source)×(spectral characteristic of object)×(spectral characteristic of sensor)×(control-value product)×(predetermined coefficient)×(exposure control coefficient 54)

Since the exposure control coefficient 54 is a coefficient that is suitable for an object (for example, a plant) that is a measurement target and depends on brightness at the time of shooting, with a control-value product satisfying the above expression, a control-value product suitable for an object that is a measurement target and brightness at the time of shooting can be calculated, and a combination of control values (exposure value) that achieves the control-value product can be set.

Referring back to the flow chart of FIG. 12, in Step S15, the exposure control unit 31 controls the exposure unit 33 and the sensor 35 with the calculated exposure value (the control values for controlling the exposure value 33 and the sensor 35) so that the sensor 35 outputs a signal of an image obtained through imaging of the predetermined object to the signal processing unit 36 (FIG. 2).

Then, in Step S16, the signal processing unit 36 performs signal processing on the supplied signal. In Step S17, the signal processing unit 36 outputs the signal processing result to the reflectance calculation unit 37.

In Step S18, the reflectance calculation unit 37 calculates reflectance and outputs the calculated reflectance to a processing unit (not illustrated), which is provided to the subsequent stage thereof (Step S19). The processing that is performed by the signal processing unit 36 and the reflectance calculation unit 37 in Steps S16 to S19 is further described.

The reflectance spectral characteristic of an object can be determined through inverse matrix calculation. Relational Expression (2) below is generally satisfied among the spectral characteristic of a light source (represented by $L(\lambda)$), the spectral characteristic of an object (represented by $P(\lambda)$), the spectral characteristic of an imaging system (represented by $S(\lambda)$), and a picked-up image (represented by $O(\lambda)$).

(Spectral characteristic of light source $L(\lambda)$)×(spectral characteristic of object $P(\lambda)$)×(spectral characteristic of imaging system $S(\lambda)$)=(image($O(\lambda)$)) (2)

The spectral characteristic of a light source is a spectral characteristic that is obtained from the illuminance sensor 12 and is, for example, the spectral characteristic of the sunlight 102 as illustrated in FIG. 13. The spectral characteristic of an object is a spectral characteristic that is obtained from reflected light from an object and is, for example, the spectral characteristic of reflected light of sunlight when the sunlight applied to a plant or concrete is reflected as illustrated in FIG. 9.

The spectral characteristic of an imaging system is a spectral characteristic of an MS sensor (in this case, the sensor including the MS filter 34 and the sensor 35) and is, for example, the spectral characteristic as illustrated in FIG. 10.

By deforming Expression (2), Expression (3) for determining the spectral characteristic of an object can be obtained.

[Math. 2]

$$P(\lambda)=O(\lambda)\times L^{-1}(\lambda)\times S^{-1}(\lambda) \quad (3)$$

In this way, by Expression (3), specifically, inverse matrix calculation, the reflectance spectral characteristic of an object can be determined.

Figure 15:
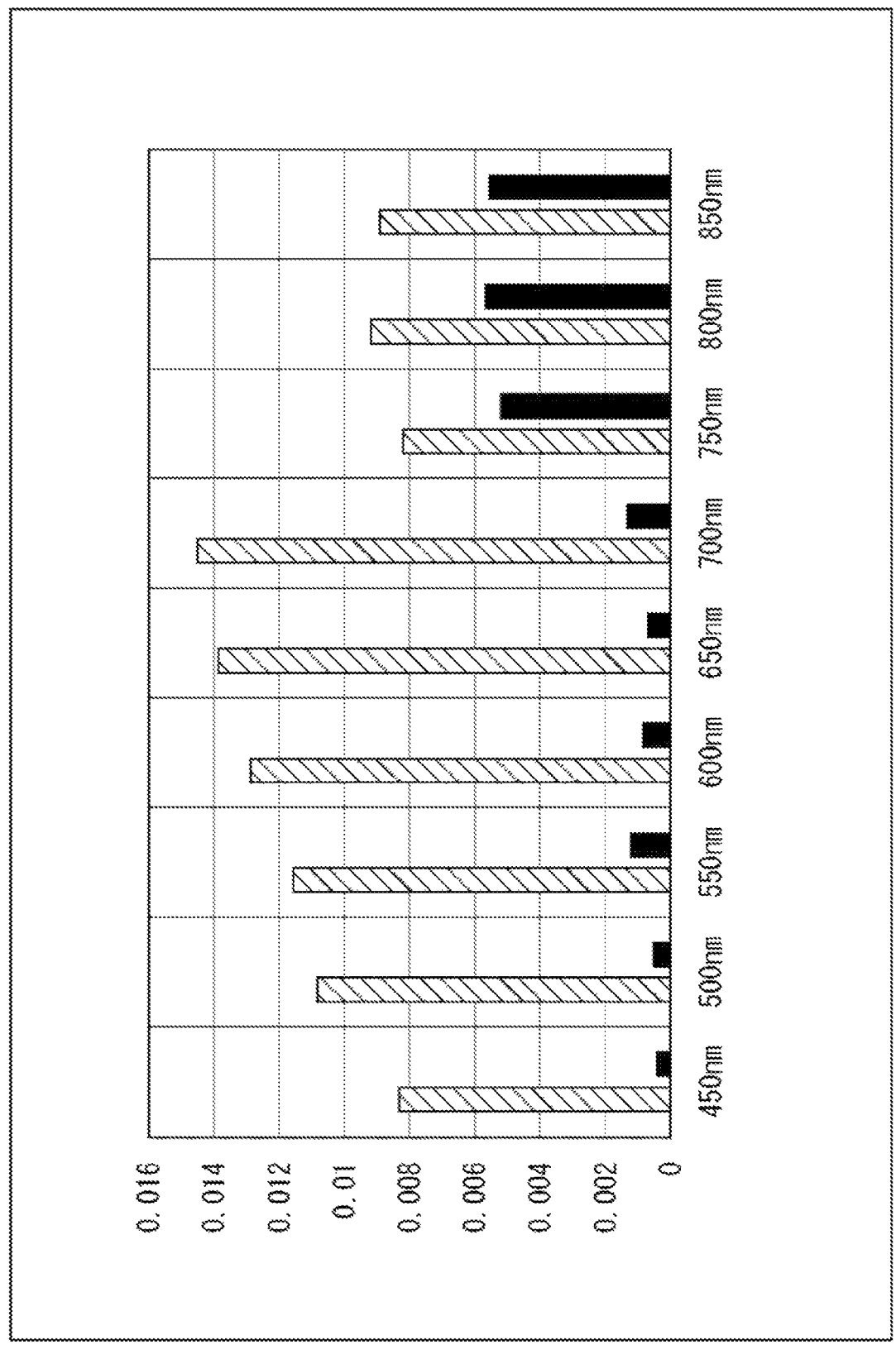
FIG. 15 is a diagram illustrating a spectral characteristic of reflected light from an object.

For example, first, through inverse transformation of the spectral characteristic of the MS sensor (for example, the spectral characteristic as illustrated in FIG. 10), the spectral characteristic of reflected light of light that is applied to an object and reflected by the object is determined. For example, a spectral characteristic as illustrated in FIG. 15 is determined. In the graph of FIG. 15, the horizontal axis represents a wavelength, and the vertical axis represents intensity. FIG. 15 is the graph of the spectral characteristic of reflected light reflected by an object such as vegetation or concrete when the spectral characteristic of the sunlight 102 as illustrated in FIG. 13 is obtained.

The spectral characteristic of reflected light from an object is calculated by the signal processing unit 36 and supplied to the reflectance calculation unit 37 as the processing result. The reflectance calculation unit 37 uses the spectral characteristic of the reflected light from the object supplied from the signal processing unit 36 to calculate reflectance. The reflectance is determined by Expression (4) below.

Reflectance=(spectral characteristic of reflected light from object)/(spectral characteristic of light source) (4)

In Expression (4), "(spectral characteristic of reflected light from object)" is a spectral characteristic generated through calculation based on Expression (3) to be output by the signal processing unit 36, and "(spectral characteristic of light source)" is the spectral characteristic of the sunlight 102 obtained from the illuminance sensor 12, for example.

Figure 16:
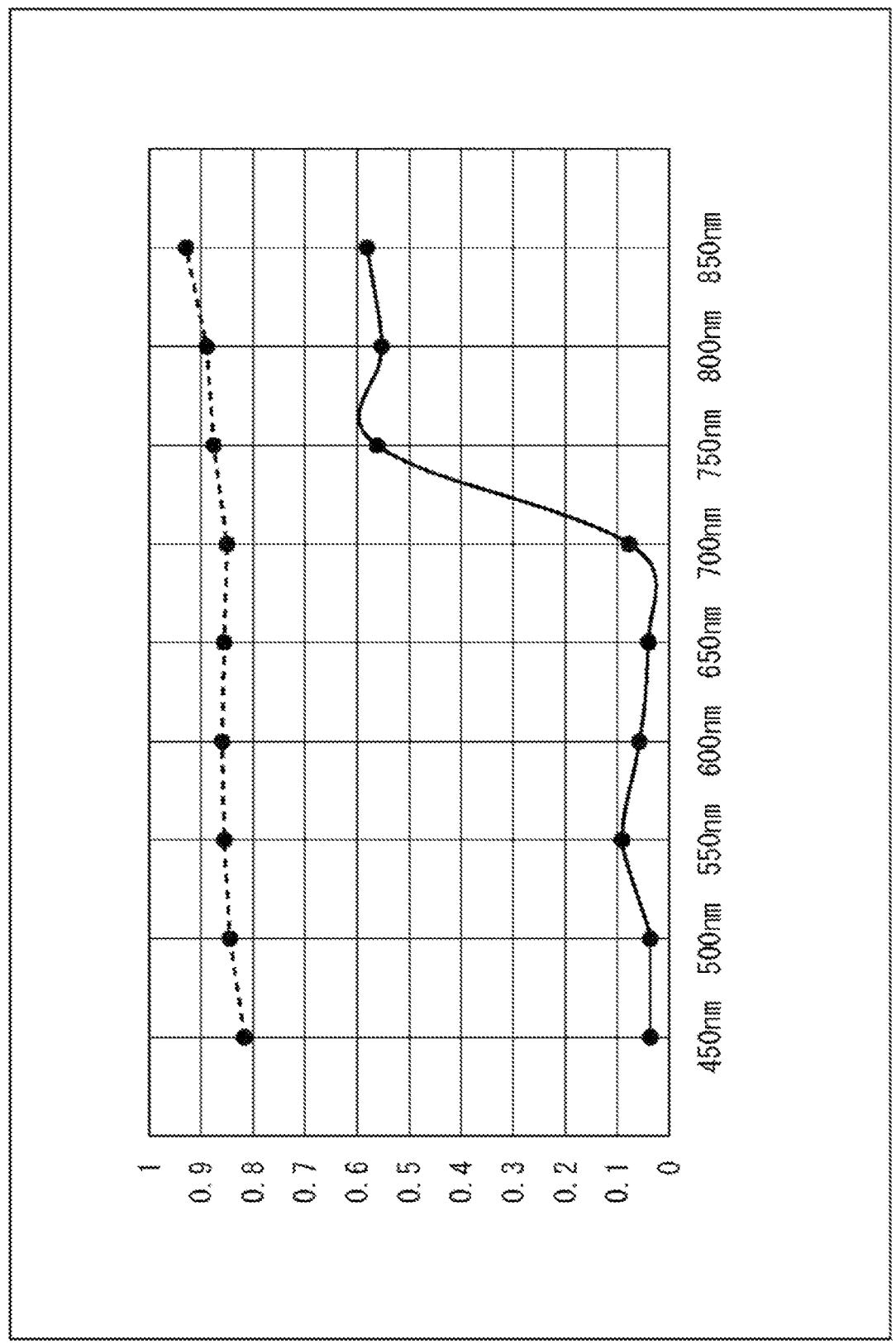
FIG. 16 is a diagram illustrating a reflectance of an object.

In this way, the reflectance of the object is determined. One example of the determined reflectance is illustrated in FIG. 16. In FIG. 16, like the reflectance graph of FIG. 9, the horizontal axis represents a wavelength, and the vertical axis represents reflectance. Further, in FIG. 16, the graph represented by the solid line indicates vegetation, and the graph represented by the dotted line indicates concrete.

FIG. 16 illustrates nine wavelengths, which are wavelengths, and reflectance calculated with each wavelength. The MS sensor is an eight-wavelength sensor and generates an image having each wavelength. The MS sensor, however, can generate an image having a wavelength other than the eight wavelengths by performing calculation based on Expression (3) above.

In other words, an image having a desired wavelength can be generated with the use of an image (image data) that is obtained from the MS sensor. Thus, even with the MS sensor that is an eight-wavelength sensor, nine types of reflectance can be calculated as illustrated in FIG. 16. Further, a wavelength whose reflectance is calculated can be also a desired wavelength other than the wavelengths passing through the MS filter 34 of the MS sensor.

In this way, the reflectance of the object is determined. Since even the same plant has different reflectance values depending on growth or other factors, for example, the growth of a plant can be determined from determined reflectance, or a good growth area and a poor growth area can be determined from the distribution (image) of reflectance.

As described above, through determination of a predicted value and setting of an exposure value (control values for controlling the exposure unit 33 and the sensor 35), an object, which is desired to be imaged, can be imaged (sensed) without overexposure. Specifically, as described above, in the database 38, the mode information 51, the object reflection spectral characteristic representative value 52, the MS sensor spectral characteristic 53, and the exposure control coefficient 54 are held, and exposure control is performed with the use of these pieces of information, so that an object, which is desired to be imaged, can be imaged without overexposure.

such imaging that An object, which is desired to be imaged, can be imaged means that, for example, when the vegetation mode is set, a plant whose vegetation is to be measured can be imaged without overexposure, and an object other than plants, such as concrete, may possibly be imaged with overexposure.

In other words, an object that is a sensing target is imaged under exposure control with an appropriate exposure amount, but an object that is not a sensing target may be imaged under exposure control with an exposure amount that may possibly be inappropriate.

If imaging is not performed on the basis of the present technology, an object that is a sensing target may possibly be imaged under exposure control with an inappropriate exposure amount, but according to the present technology, an object that is a sensing target can be imaged under exposure control with an exposure amount suitable therefor.

<Another Configuration and Operation of Imaging Apparatus>

In the example of the above-mentioned embodiment, in the database 38, the mode information 51, the object reflection spectral characteristic representative value 52, the MS sensor spectral characteristic 53, and the exposure control coefficient 54 are held, and an exposure value is appropriately calculated depending on each illuminance value from the illuminance sensor 12.

For example, the following configuration can also be employed: a table may be stored in the database 38, and an exposure value (a combination of control values) depending on an illuminance value may be read out from the table.

Figure 17:
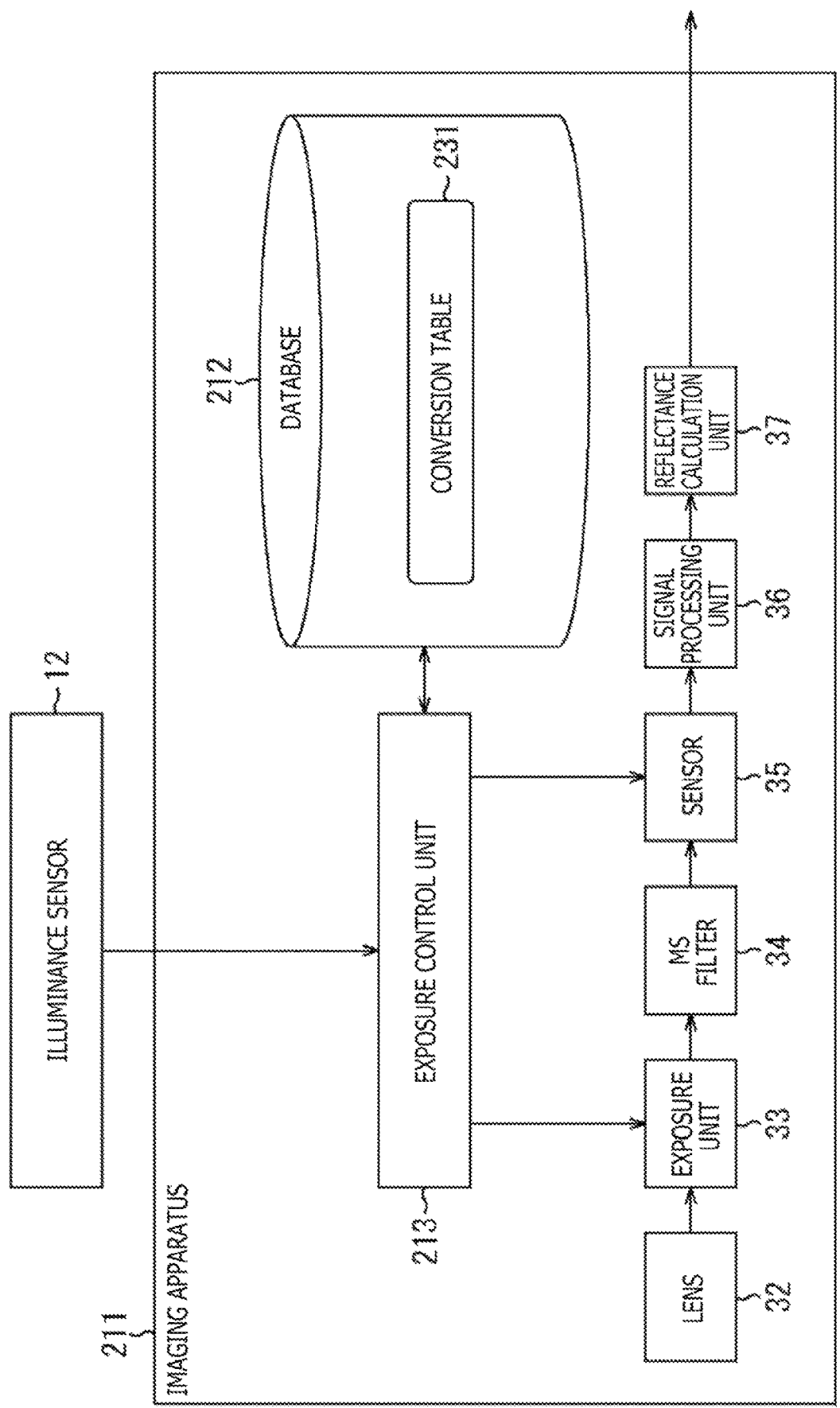
FIG. 17 is a diagram illustrating another configuration of the imaging apparatus.

FIG. 17 is a diagram illustrating a configuration of an imaging apparatus of a second embodiment. An imaging apparatus 211 illustrated in FIG. 17 basically has a similar configuration to the imaging apparatus 11 illustrated in FIG. 2, and hence, similar parts are denoted by the same reference numerals, and description thereof is appropriately omitted.

The imaging apparatus 211 illustrated in FIG. 17 is different from the imaging apparatus 11 illustrated in FIG. 2 in that a conversion table 231 is stored in a database 212, and an exposure control unit 213 uses data described in the conversion table 231 to set an exposure value. The remaining configurations of the imaging apparatus 211 are similar to those of the imaging apparatus 11 illustrated in FIG. 2.

The conversion table 231 is an M×N matrix table in which, as illustrated in FIG. 18, M representative light source patterns and information regarding N objects (modes) that are measurement targets are associated with each other.

Figure 19:
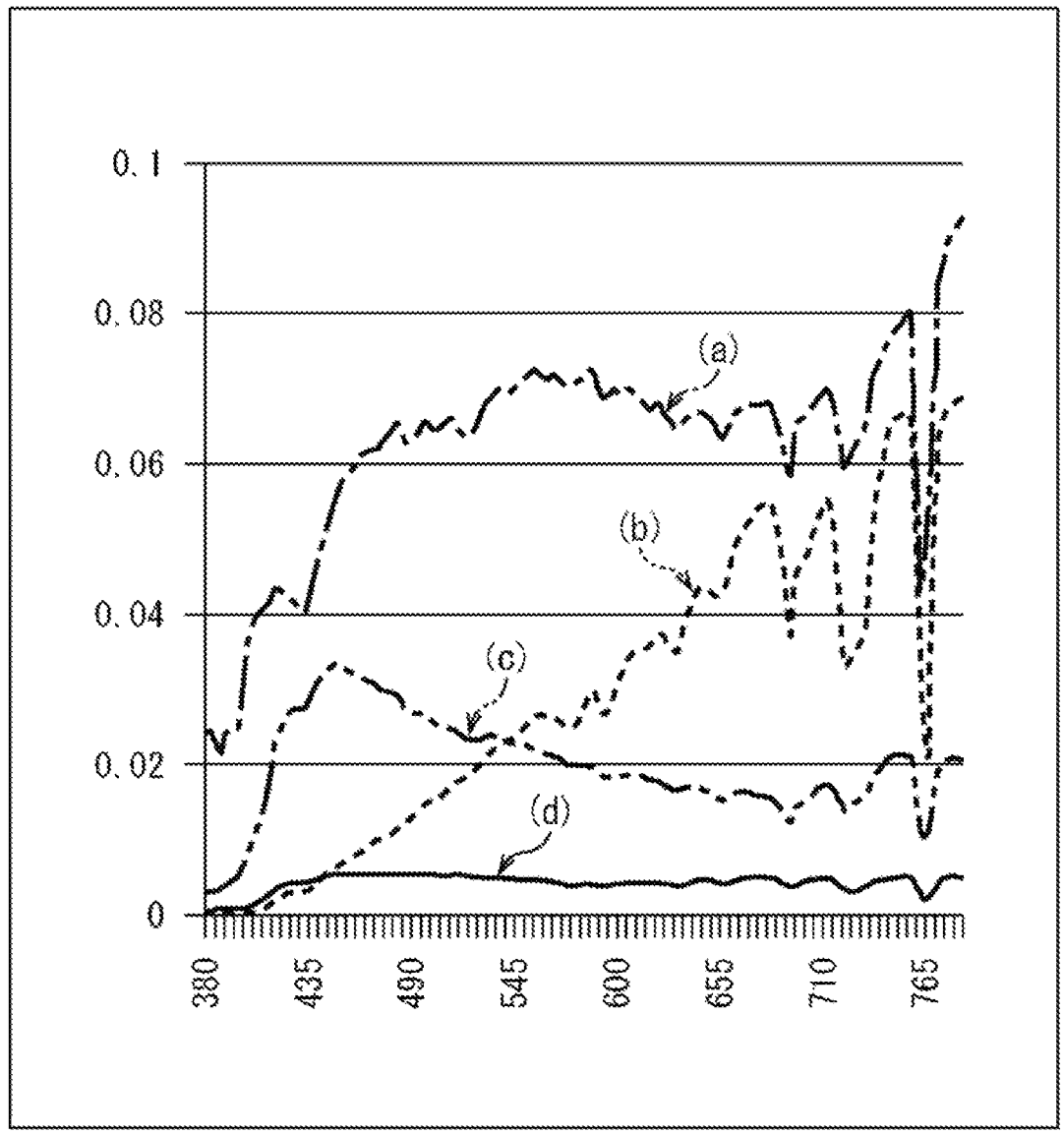
FIG. 19 is a diagram illustrating light source patterns.

As the representative light source patterns, for example, patterns as illustrated in FIG. 19 are given. The graph of FIG. 19 is a graph illustrating the spectral characteristics of sunlight. In FIG. 19, (a) indicates the spectral characteristic of sunlight in summer, (b) indicates the spectral characteristic of sunlight in the early evening, (c) indicates the spectral characteristic of sunlight in the shade, and (d) indicates the spectral characteristic of sunlight when it is cloudy.

As the light source (sunlight) patterns, such M patterns are described in the conversion table 231.

The N objects include objects that are measurement targets, for example, vegetation, structures, and food. In the conversion table 231, N pieces of object information (specification information for specifying kinds of measurement targets) are described. In other words, the N objects correspond to the above-mentioned modes, and N modes are described in the conversion table 231.

The conversion table 231 is the M×N matrix table in which the M light source spectral characteristic patterns and the N modes are associated with each other, and is a table in which an exposure value is uniquely determined from a light source spectral characteristic and a mode (object information).

Note that, in a case where imaging conditions are narrowed down to some extent, for example, in a case where images are acquired by aerial photography that is highly likely to be performed in the daytime in good weather, the number of patterns of the M light source patterns described above can take a value which is narrowed down, that is, the number of patterns described in the conversion table 231 can be smaller than the M patterns.

Further, the conversion table 231 including one representative light source pattern and specification information for specifying kinds of measurement targets may be used. In this case, the conversion table 231 is a table in which an exposure value is uniquely determined from the specification information, for example, information associated with a mode.

In a case where the conversion table 231 in which the M light source spectral characteristic patterns are described is used, for example, the M patterns described in the conversion table 231 and an illuminance value from the illuminance sensor 12 are compared to each other, and a pattern having a high degree of matching is selected from the M patterns. Then, an exposure value that is uniquely determined from the selected pattern and a set mode (object information) is read out from the conversion table 231. The imaging apparatus 211 is configured as described above.

Figure 20:
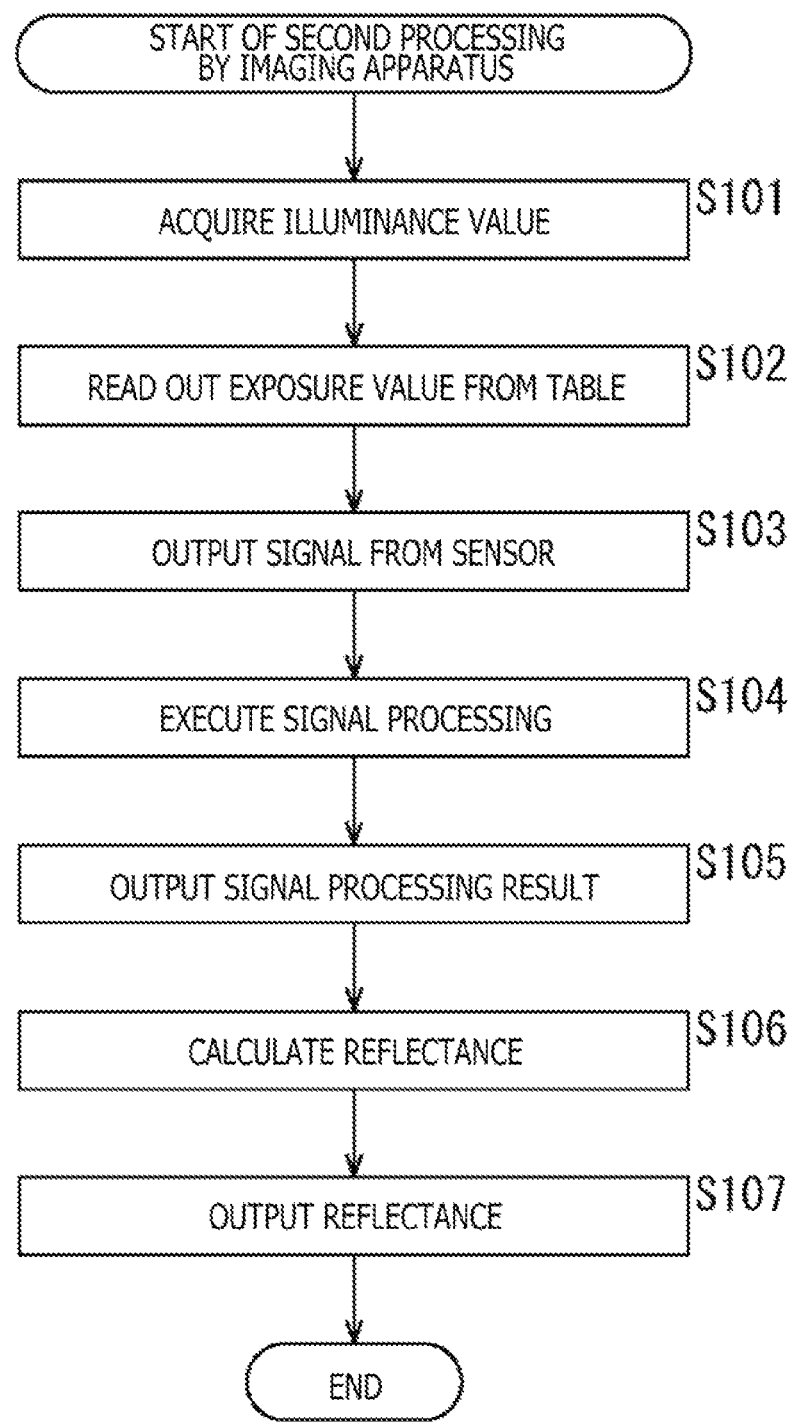
FIG. 20 is a flow chart illustrating operation of the imaging apparatus.

With reference to the flow chart of FIG. 20, operation of the imaging apparatus 211 is described.

In Step S101, the imaging apparatus 211 acquires an illuminance value from the illuminance sensor 12. In Step S102, the exposure control unit 213 of the imaging apparatus 211 reads out an exposure value from the database 212.

The exposure control unit 213 detects, from the M×N matrix conversion table 231, a pattern matched with (similar to) the supplied illuminance value.

For example, in a case where the supplied illuminance value (spectral characteristic) is matched with (similar to) the spectral characteristic of sunlight when it is cloudy, it is detected that the sunlight has the pattern when it is cloudy. The exposure control unit 213 also acquires information regarding a mode that is set at that time (an object that is a measurement target).

The exposure control unit 213 reads out an exposure value associated with the detected light source pattern and the set mode. When the exposure value is read out from the conversion table 231, the processing proceeds to Step S104.

Processing in Steps S104 to S107 is performed similarly to the processing in Steps S15 to S19 illustrated in the flow chart of FIG. 12, and hence, description thereof is omitted.

In this way, also in the case of the configuration in which the conversion table 231 is stored in the database 212 and an exposure value is read out therefrom, an exposure value suitable for an object that is a sensing target can be set as in the imaging apparatus 11 of the first embodiment.

Further, with the configuration in which the conversion table 231 is stored in the database 212 and an exposure value is read out therefrom, a period of time from when an illuminance value is acquired to when an exposure value is set can be shortened with respect to the case where an exposure value is calculated as in the imaging apparatus 11 of the first embodiment.

According to the present technology, an exposure value suitable for an object that is a sensing target can be set, so that appropriate imaging can be performed.

Further, according to the present technology, for example, a configuration that analyzes a picked-up image to detect an object that is a sensing target in the image and sets an exposure value suitable for the object is not employed, and hence there is no need to analyze an image, for example. As a result, the time taken for setting an exposure value can be shortened, or the processing load can be reduced, and an exposure value suitable for an object that is a sensing target can be set as described above.

<With Regard to Recoding Medium>

The series of processing described above can be executed by hardware or software. In a case where the series of processing is executed by software, a program of the software is installed on a computer. Here, examples of the computer include a computer incorporated in dedicated hardware and a general-purpose personal computer capable of executing various functions with various programs installed thereon, for example.

Figure 21:
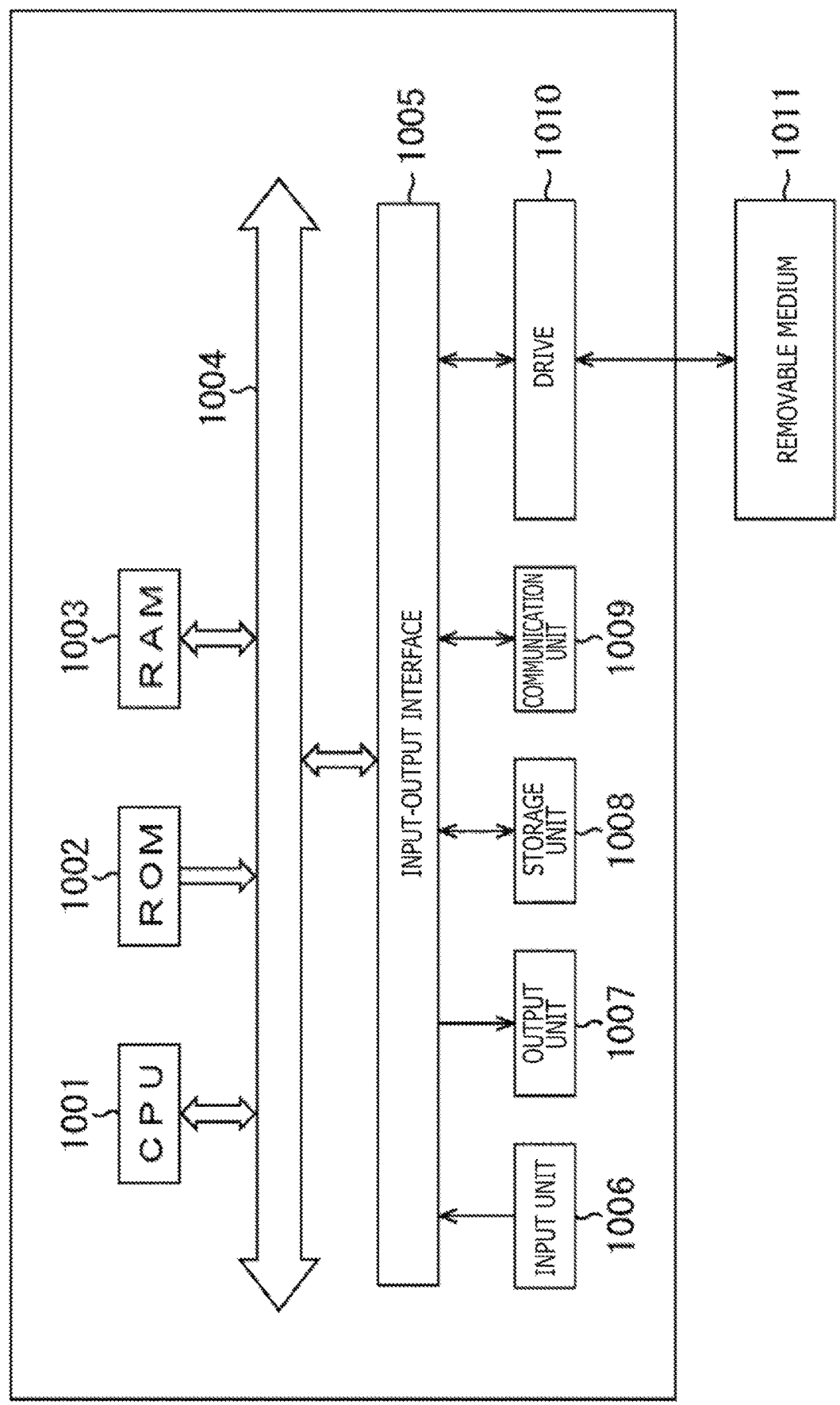
FIG. 21 is a diagram illustrating a recoding medium.

FIG. 21 is a block diagram illustrating a configuration example of computer hardware which executes the series of processing described above with a program. In the computer, a CPU (Central Processing Unit) 1001, a ROM (Read Only Memory) 1002, and a RAM (Random Access Memory) 1003 are connected to each other through a bus 1004. To the bus 1004, an input-output interface 1005 is also connected. To the input-output interface 1005, an input unit 1006, an output unit 1007, a storage unit 1008, a communication unit 1009, and a drive 1010 are connected.

The input unit 1006 includes, for example, a keyboard, a mouse, or a microphone. The output unit 1007 includes, for example, a display or a speaker. The storage unit 1008 includes, for example, a hard disk or a non-volatile memory. The communication unit 1009 includes a network interface, for example. The drive 1010 drives a removable medium 1011 such as a magnetic disk, an optical disk, a magneto-optical disk, or a semiconductor memory.

In the computer configured as described above, the series of processing described above is performed by the CPU 1001 loading the program stored in the storage unit 1008 into the RAM 1003 through the input-output interface 1005 and the bus 1004 to execute the program, for example.

The program that the computer (CPU 1001) executes can be recorded on the removable medium 1011 such as a package medium to be provided, for example. Further, the program can be provided through a wired or wireless transmission medium such as a local area network, the Internet, or digital satellite broadcasting.

In the computer, the program can be installed on the storage unit 1008 through the input-output interface 1005 with the removable medium 1011 being mounted on the drive 1010. Further, the program can be received by the communication unit 1009 through a wired or wireless transmission medium to be installed on the storage unit 1008. Besides, the program can be installed on the ROM 1002 or the storage unit 1008 in advance.

Note that, with regard to the program that the computer executes, the processing of the program may be performed in chronological order in the order described herein or in parallel. Alternatively, the processing of the program may each be performed at a right timing, for example, when an invocation is issued.

Further, the system described herein represents a whole apparatus including a plurality of apparatus.

Note that the effects described herein are merely exemplary and are not limited. Other effects may be provided.

Note that embodiments of the present technology are not limited to the embodiments described above, and various modifications can be made within the range not departing from the gist of the present technology.

Note that the present technology can also employ the following configurations.

(1) An imaging apparatus including:

an imaging unit including a plurality of pixels having different spectral characteristics; and an exposure control unit setting information associated with exposure control on the plurality of pixels depending on specification information for specifying a kind of a measurement target.

(2) The imaging apparatus according to Item (1), in which the exposure control unit controls the imaging unit on the basis of the information set.

(3) The imaging apparatus according to Item (1) or (2), in which the information includes exposure time or sensitivity of the plurality of pixels.

(4) The imaging apparatus according to any one of Items (1) to (3), in which the imaging unit includes a stop, and the information includes an opening amount of the stop.

(5) The imaging apparatus according to any one of Items (1) to (4), in which the kind of the measurement target is specified by a user.

(6) The imaging apparatus according to any one of Items (1) to (5), further including:

a storage unit storing the information depending on the specification information, in which the exposure control unit reads out the information from the storage unit.

(7) The imaging apparatus according to Item (1), in which the exposure control unit uses a spectral characteristic of the measurement target, a spectral characteristic of each of the pixels, and a spectral characteristic of a light source to calculate a predicted value that is predicted output from each of the pixels, and uses the predicted value to set the information.

(8) The imaging apparatus according to Item (7), in which the spectral characteristic of the light source includes a value measured by an illuminance value sensor.

(9) The imaging apparatus according to Item (7), in which the information is set to a value that prevents overexposure of one of the pixels that has a highest predicted value.

(10) An imaging method including: setting, by an imaging apparatus which performs imaging by an imaging unit including a plurality of pixels having different spectral characteristics, information associated with exposure control on the plurality of pixels depending on specification information for specifying a kind of a measurement target.

(11) A program for causing a computer which controls an imaging apparatus including an imaging unit including a plurality of pixels having different spectral characteristics to execute processes including a step of:

setting information associated with exposure control on the plurality of pixels depending on specification information for specifying a kind of a measurement target.

(12) An imaging apparatus including: an imaging unit including a plurality of pixels having different spectral characteristics; and an exposure control unit configured to set information associated with exposure control on the plurality of pixels on the basis of a predicted output value of each of the plurality of pixels based on a spectral characteristic related to a measurement target.

(13) The imaging apparatus according to Item (12), in which the exposure control unit controls the imaging unit on the basis of the information set.

(14) The imaging apparatus according to Item (12) or (13), in which the information includes exposure time or sensitivity of the plurality of pixels.

(15) The imaging apparatus according to any one of Items (12) to (14), in which the imaging unit includes a stop, and the information includes an opening amount of the stop.

(16) The imaging apparatus according to any one of Items (12) to (15), in which the measurement target is set by a user.

(17) The imaging apparatus according to any one of Items (12) to (16), further including:

a storage unit storing the information depending on the measurement target, in which the exposure control unit reads out the information from the storage unit.

(18) The imaging apparatus according to Item (12), in which the exposure control unit calculates the predicted output value by using a spectral characteristic of the measurement target, a spectral characteristic of each of the pixels, and a spectral characteristic of a light source, and uses the predicted output value to set the information.

(19) The imaging apparatus according to Item (18), in which the spectral characteristic of the light source includes a value measured by an illuminance value sensor.

(20) The imaging apparatus according to any one of Items (12) to (19), in which the information is set to a value that prevents overexposure of one of the pixels that has a highest predicted output value.

REFERENCE SIGNS LIST

11 Imaging apparatus, 12 Illuminance sensor, 31 Exposure control unit, 32 Lens, 33 Exposure unit, 34 MS filter, 35 Sensor, 36 Signal processing unit, 37 Reflectance calculation unit, 38 Database, 211 Imaging apparatus, 212 Database, 213 Exposure control unit, 231 Conversion table

The invention claimed is:

1. An imaging apparatus comprising:
an imager including a plurality of pixels having different spectral characteristics; and
an exposure controller configured to set information associated with exposure control on the plurality of pixels depending on specification information for specifying a kind of a measurement target, and calculate a predicted value that is a predicted output from each of the pixels, and use the predicted value to determine the set information.

2. The imaging apparatus according to claim 1,
wherein the exposure controller controls the imager on a basis of the set information.

3. The imaging apparatus according to claim 1,
wherein the set information includes exposure time or sensitivity of the plurality of pixels.

4. The imaging apparatus according to claim 1,
wherein the imager includes a stop, and
the set information includes an opening amount of the stop.

5. The imaging apparatus according to claim 1,
wherein the kind of the measurement target is specified by a user.

6. The imaging apparatus according to claim 1, further comprising:
a memory storing the information depending on the specification information,
wherein the exposure controller reads out the information from the memory.

7. The imaging apparatus according to claim 1,
wherein the exposure controller uses a spectral characteristic of the measurement target, a spectral characteristic of each of the pixels, and a spectral characteristic of a light source to calculate the predicted value that is the predicted output from each of the pixels.

8. The imaging apparatus according to claim 7,
wherein the spectral characteristic of the light source includes a value measured by an illuminance value sensor.

9. The imaging apparatus according to claim 7,
wherein the set information is set to a value that prevents overexposure of one of the pixels that has a highest predicted value.

10. An imaging method comprising:
setting, by an imaging apparatus which performs imaging by an imager including a plurality of pixels having different spectral characteristics, information associated with exposure control on the plurality of pixels depending on specification information for specifying a kind of a measurement target, and calculating a predicted value that is predicted output from each of the pixels, and using the predicted value to determine the set information.

11. A non-transitory computer-readable medium storing a program for causing a computer which controls an imaging apparatus including an imaging unit including a plurality of pixels having different spectral characteristics to execute processes including a step of:

setting information associated with exposure control on the plurality of pixels depending on specification information for specifying a kind of a measurement target, and calculating a predicted value that is predicted output from each of the pixels, and using the predicted value to determine the set information.

12. An imaging apparatus comprising:
an imager including a plurality of pixels having different spectral characteristics; and
an exposure controller configured to set information associated with exposure control on the plurality of pixels on a basis of a predicted output value of each of the plurality of pixels based on a spectral characteristic related to a measurement target.

13. The imaging apparatus according to claim 12,
wherein the exposure controller controls the imager on a basis of the information set.

14. The imaging apparatus according to claim 12,
wherein the set information includes exposure time or sensitivity of the plurality of pixels.

15. The imaging apparatus according to claim 12,
wherein the imager includes a stop, and
the set information includes an opening amount of the stop.

16. The imaging apparatus according to claim 12,
wherein the measurement target is set by a user.

17. The imaging apparatus according to claim 12, further comprising:
a memory storing the information depending on the measurement target,
wherein the exposure controller reads out the information from the storage unit.

18. The imaging apparatus according to claim 12,
wherein the exposure controller calculates the predicted output value by using a spectral characteristic of the measurement target, a spectral characteristic of each of the pixels, and a spectral characteristic of a light source, and uses the predicted output value to set the information.

19. The imaging apparatus according to claim 18,
wherein the spectral characteristic of the light source includes a value measured by an illuminance value sensor.

20. The imaging apparatus according to claim 12,
wherein the set information is set to a value that prevents overexposure of one of the pixels that has a highest predicted output value.

* * * * *